(12) United States Patent
Chan et al.

(10) Patent No.: US 11,151,743 B2
(45) Date of Patent: Oct. 19, 2021

(54) METHOD, SYSTEM AND APPARATUS FOR END OF AISLE DETECTION

(71) Applicant: ZEBRA TECHNOLOGIES CORPORATION, Lincolnshire, IL (US)

(72) Inventors: Tze Fung Christopher Chan, Toronto (CA); Feng Cao, Burlington (CA); Mehdi Mazaheri Tehrani, Brampton (CA); Mahyar Vajedi, Mississauga (CA)

(73) Assignee: Zebra Technologies Corporation, Lincolnshire, IL (US)

( * ) Notice: Subject to any disclaimer, the term of this patent is extended or adjusted under 35 U.S.C. 154(b) by 138 days.

(21) Appl. No.: 16/429,927

(22) Filed: Jun. 3, 2019

(65) Prior Publication Data

US 2020/0380715 A1 Dec. 3, 2020

(51) Int. Cl.
*G06T 7/70* (2017.01)
*G06T 7/73* (2017.01)
(Continued)

(52) U.S. Cl.
CPC .............. *G06T 7/73* (2017.01); *G01C 21/206* (2013.01); *G01C 23/00* (2013.01); *G01S 17/89* (2013.01);
(Continued)

(58) Field of Classification Search
CPC ....... G06T 7/70–77; G06T 7/50; G06T 7/181; G06T 7/13; G06T 7/168;
(Continued)

(56) References Cited

U.S. PATENT DOCUMENTS 5,209,712 A 5/1993 Ferri
5,214,615 A 5/1993 Bauer
(Continued)

FOREIGN PATENT DOCUMENTS

CA 2835830 11/2012
CA 3028156 1/2018
(Continued)

OTHER PUBLICATIONS

Dubois, M., et al., 'A comparison of geometric and energy-based point cloud semantic segmentation methods, European Conference on Mobile Robots (ECMR), pp. 88-93, 25-27, Sep. 2013.
(Continued)

*Primary Examiner* — Sean T Motsinger

(57) ABSTRACT

A method of detecting an end of an aisle of shelf modules in an imaging controller of a mobile automation apparatus, includes: obtaining image data captured by an image sensor and a plurality of depth measurements captured by a depth sensor, the image data and the depth measurements corresponding to an area containing a portion of the aisle of shelf modules; obtaining locomotive data of the apparatus; generating a dynamic trust region based on the locomotive data; detecting an edge segment based on the image data and the plurality of depth measurements, the edge segment representing an edge of a support surface; and when the edge segment is located at least partially in the dynamic trust region, updating an estimated end of the aisle based on the detected edge segment.

18 Claims, 7 Drawing Sheets

(51) Int. Cl.
| | | |
|---|---|---|
| G01C 21/20 | (2006.01) | |
| G01S 17/89 | (2020.01) | |
| G06Q 10/08 | (2012.01) | |
| G06T 7/13 | (2017.01) | |
| G06T 7/50 | (2017.01) | |
| G01C 23/00 | (2006.01) | |
| G06K 9/00 | (2006.01) | |
| G06T 7/181 | (2017.01) | |
| G06T 7/168 | (2017.01) | |

(52) U.S. Cl.
CPC ..... *G06K 9/00201* (2013.01); *G06K 9/00208* (2013.01); *G06K 9/00214* (2013.01); *G06Q 10/087* (2013.01); *G06T 7/13* (2017.01); *G06T 7/168* (2017.01); *G06T 7/181* (2017.01); *G06T 7/50* (2017.01)

(58) Field of Classification Search
CPC ........... G06T 2207/10028; G01S 17/86; G01S 17/89; G01C 23/00; G01C 21/206; G06Q 10/087
See application file for complete search history.

(56) References Cited

U.S. PATENT DOCUMENTS

| | | | |
|---|---|---|---|
| 5,408,322 | A | 4/1995 | Hsu et al. |
| 5,414,268 | A | 5/1995 | McGee |
| 5,423,617 | A | 6/1995 | Marsh et al. |
| 5,534,762 | A | 7/1996 | Kim |
| 5,566,280 | A | 10/1996 | Fukui et al. |
| 5,704,049 | A | 12/1997 | Briechle |
| 5,953,055 | A | 9/1999 | Huang et al. |
| 5,988,862 | A | 11/1999 | Kacyra et al. |
| 6,026,376 | A | 2/2000 | Kenney |
| 6,034,379 | A | 3/2000 | Bunte et al. |
| 6,075,905 | A | 6/2000 | Herman et al. |
| 6,115,114 | A | 9/2000 | Berg et al. |
| 6,141,293 | A | 10/2000 | Amorai-Moriya et al. |
| 6,304,855 | B1 | 10/2001 | Burke |
| 6,442,507 | B1 | 8/2002 | Skidmore et al. |
| 6,549,825 | B2 | 4/2003 | Kurata |
| 6,580,441 | B2 | 6/2003 | Schileru-Key |
| 6,711,293 | B1 | 3/2004 | Lowe |
| 6,721,723 | B1 | 4/2004 | Gibson et al. |
| 6,721,769 | B1 | 4/2004 | Rappaport et al. |
| 6,836,567 | B1 | 12/2004 | Silver et al. |
| 6,995,762 | B1 | 2/2006 | Pavlidis et al. |
| 7,090,135 | B2 | 8/2006 | Patel |
| 7,137,207 | B2 | 11/2006 | Armstrong et al. |
| 7,245,558 | B2 | 7/2007 | Willins et al. |
| 7,248,754 | B2 | 7/2007 | Cato |
| 7,277,187 | B2 | 10/2007 | Smith et al. |
| 7,373,722 | B2 | 5/2008 | Cooper et al. |
| 7,474,389 | B2 | 1/2009 | Greenberg et al. |
| 7,487,595 | B2 | 2/2009 | Armstrong et al. |
| 7,493,336 | B2 | 2/2009 | Noonan |
| 7,508,794 | B2 | 3/2009 | Feather et al. |
| 7,527,205 | B2 | 5/2009 | Zhu et al. |
| 7,605,817 | B2 | 10/2009 | Zhang et al. |
| 7,647,752 | B2 | 1/2010 | Magnell |
| 7,693,757 | B2 | 4/2010 | Zimmerman |
| 7,726,575 | B2 | 6/2010 | Wang et al. |
| 7,751,928 | B1 | 7/2010 | Antony et al. |
| 7,783,383 | B2 | 8/2010 | Eliuk et al. |
| 7,839,531 | B2 | 11/2010 | Sugiyama |
| 7,845,560 | B2 | 12/2010 | Emanuel et al. |
| 7,885,865 | B2 | 2/2011 | Benson et al. |
| 7,925,114 | B2 | 4/2011 | Mai et al. |
| 7,957,998 | B2 | 6/2011 | Riley et al. |
| 7,996,179 | B2 | 8/2011 | Lee et al. |
| 8,009,864 | B2 | 8/2011 | Linaker et al. |
| 8,049,621 | B1 | 11/2011 | Egan |
| 8,091,782 | B2 | 1/2012 | Cato et al. |
| 8,094,902 | B2 | 1/2012 | Crandall et al. |
| 8,094,937 | B2 | 1/2012 | Teoh et al. |
| 8,132,728 | B2 | 3/2012 | Dwinell et al. |
| 8,134,717 | B2 | 3/2012 | Pangrazio et al. |
| 8,189,855 | B2 | 5/2012 | Opalach et al. |
| 8,199,977 | B2 | 6/2012 | Krishnaswamy et al. |
| 8,207,964 | B1 | 6/2012 | Meadow et al. |
| 8,233,055 | B2 | 7/2012 | Matsunaga et al. |
| 8,260,742 | B2 | 9/2012 | Cognigni et al. |
| 8,265,895 | B2 | 9/2012 | Willins et al. |
| 8,277,396 | B2 | 10/2012 | Scott et al. |
| 8,284,988 | B2 | 10/2012 | Sones et al. |
| 8,423,431 | B1 | 4/2013 | Rouaix et al. |
| 8,429,004 | B2 | 4/2013 | Hamilton et al. |
| 8,463,079 | B2 | 6/2013 | Ackley et al. |
| 8,479,996 | B2 | 7/2013 | Barkan et al. |
| 8,520,067 | B2 | 8/2013 | Ersue |
| 8,542,252 | B2 | 9/2013 | Perez et al. |
| 8,571,314 | B2 | 10/2013 | Tao et al. |
| 8,599,303 | B2 | 12/2013 | Stettner |
| 8,630,924 | B2 | 1/2014 | Groenevelt et al. |
| 8,743,176 | B2 | 6/2014 | Stettner et al. |
| 8,757,479 | B2 | 6/2014 | Clark et al. |
| 8,812,226 | B2 | 8/2014 | Zeng |
| 8,923,893 | B2 | 12/2014 | Austin et al. |
| 8,939,369 | B2 | 1/2015 | Olmstead et al. |
| 8,954,188 | B2 | 2/2015 | Sullivan et al. |
| 8,958,911 | B2 | 2/2015 | Wong et al. |
| 8,971,637 | B1 | 3/2015 | Rivard |
| 8,989,342 | B2 | 3/2015 | Liesenfelt et al. |
| 9,007,601 | B2 | 4/2015 | Steffey et al. |
| 9,037,287 | B1 | 5/2015 | Grauberger et al. |
| 9,064,394 | B1 | 6/2015 | Trundle |
| 9,070,285 | B1 | 6/2015 | Ramu et al. |
| 9,072,929 | B1 | 7/2015 | Rush et al. |
| 9,120,622 | B1 | 9/2015 | Elazary et al. |
| 9,129,277 | B2 | 9/2015 | Macintosh |
| 9,135,491 | B2 | 9/2015 | Morandi et al. |
| 9,159,047 | B2 | 10/2015 | Winkel |
| 9,171,442 | B2 | 10/2015 | Clements |
| 9,247,211 | B2 | 1/2016 | Zhang et al. |
| 9,329,269 | B2 | 5/2016 | Zeng |
| 9,349,076 | B1 | 5/2016 | Liu et al. |
| 9,367,831 | B1 | 6/2016 | Besehanic |
| 9,380,222 | B2 | 6/2016 | Clayton et al. |
| 9,396,554 | B2 | 7/2016 | Williams et al. |
| 9,400,170 | B2 | 7/2016 | Steffey |
| 9,424,482 | B2 | 8/2016 | Patel et al. |
| 9,517,767 | B1 | 12/2016 | Kentley et al. |
| 9,542,746 | B2 | 1/2017 | Wu et al. |
| 9,549,125 | B1 | 1/2017 | Goyal et al. |
| 9,562,971 | B2 | 2/2017 | Shenkar et al. |
| 9,565,400 | B1 | 2/2017 | Curlander et al. |
| 9,589,353 | B2 | 3/2017 | Mueller-Fischer et al. |
| 9,600,731 | B2 | 3/2017 | Yasunaga et al. |
| 9,600,892 | B2 | 3/2017 | Patel et al. |
| 9,612,123 | B1 | 4/2017 | Levinson et al. |
| 9,639,935 | B1 | 5/2017 | Douady-Pleven et al. |
| 9,660,338 | B2 | 5/2017 | Wild et al. |
| 9,697,429 | B2 | 7/2017 | Patel et al. |
| 9,766,074 | B2 | 9/2017 | Roumeliotis et al. |
| 9,778,388 | B1 | 10/2017 | Connor |
| 9,779,205 | B2 | 10/2017 | Namir |
| 9,791,862 | B1 | 10/2017 | Connor |
| 9,805,240 | B1 | 10/2017 | Zheng et al. |
| 9,811,754 | B2 | 11/2017 | Schwartz |
| 9,827,683 | B1 | 11/2017 | Hance et al. |
| 9,880,009 | B2 | 1/2018 | Bell |
| 9,928,708 | B2 | 3/2018 | Lin et al. |
| 9,953,420 | B2 | 4/2018 | Wolski et al. |
| 9,980,009 | B2 | 5/2018 | Jiang et al. |
| 9,994,339 | B2 | 6/2018 | Colson et al. |
| 9,996,818 | B1 | 6/2018 | Ren et al. |
| 10,019,803 | B2 | 7/2018 | Venable et al. |
| 10,111,646 | B2 | 10/2018 | Nycz et al. |
| 10,121,072 | B1 | 11/2018 | Kekatpure |
| 10,127,438 | B1 | 11/2018 | Fisher et al. |
| 10,197,400 | B2 | 2/2019 | Jesudason et al. |
| 10,210,603 | B2 | 2/2019 | Venable et al. |

(56) References Cited

U.S. PATENT DOCUMENTS

| | | |
|---|---|---|
| 10,229,386 B2 | 3/2019 | Thomas |
| 10,248,653 B2 | 4/2019 | Blassin et al. |
| 10,262,294 B1 | 4/2019 | Hahn et al. |
| 10,265,871 B2 | 4/2019 | Hance et al. |
| 10,289,990 B2 | 5/2019 | Rizzolo et al. |
| 10,336,543 B1 | 7/2019 | Sills et al. |
| 10,349,031 B2 | 7/2019 | Deluca |
| 10,352,689 B2 | 7/2019 | Brown et al. |
| 10,373,116 B2 | 8/2019 | Medina et al. |
| 10,394,244 B2 | 8/2019 | Song et al. |
| 2001/0031069 A1 | 10/2001 | Kondo et al. |
| 2001/0041948 A1 | 11/2001 | Ross et al. |
| 2002/0006231 A1 | 1/2002 | Jayant et al. |
| 2002/0059202 A1 | 5/2002 | Hadzikadic et al. |
| 2002/0097439 A1 | 7/2002 | Braica |
| 2002/0146170 A1 | 10/2002 | Rom |
| 2002/0158453 A1 | 10/2002 | Levine |
| 2002/0164236 A1 | 11/2002 | Fukuhara et al. |
| 2003/0003925 A1 | 1/2003 | Suzuki |
| 2003/0094494 A1 | 5/2003 | Blanford et al. |
| 2003/0174891 A1 | 9/2003 | Wenzel et al. |
| 2004/0021313 A1 | 2/2004 | Gardner et al. |
| 2004/0084527 A1 | 5/2004 | Bong et al. |
| 2004/0131278 A1 | 7/2004 | Imagawa et al. |
| 2004/0240754 A1 | 12/2004 | Smith et al. |
| 2005/0016004 A1 | 1/2005 | Armstrong et al. |
| 2005/0114059 A1 | 5/2005 | Chang et al. |
| 2005/0174351 A1 | 8/2005 | Chang |
| 2005/0213082 A1 | 9/2005 | DiBernardo et al. |
| 2005/0213109 A1 | 9/2005 | Schell et al. |
| 2006/0032915 A1 | 2/2006 | Schwartz |
| 2006/0045325 A1 | 3/2006 | Zavadsky et al. |
| 2006/0106742 A1 | 5/2006 | Bochicchio et al. |
| 2006/0279527 A1 | 12/2006 | Zehner et al. |
| 2006/0285486 A1 | 12/2006 | Roberts et al. |
| 2007/0036398 A1 | 2/2007 | Chen |
| 2007/0074410 A1 | 4/2007 | Armstrong et al. |
| 2007/0272732 A1 | 11/2007 | Hindmon |
| 2008/0002866 A1 | 1/2008 | Fujiwara |
| 2008/0025565 A1 | 1/2008 | Zhang et al. |
| 2008/0027591 A1 | 1/2008 | Lenser et al. |
| 2008/0077511 A1 | 3/2008 | Zimmerman |
| 2008/0159634 A1 | 7/2008 | Sharma et al. |
| 2008/0164310 A1 | 7/2008 | Dupuy et al. |
| 2008/0175513 A1 | 7/2008 | Lai et al. |
| 2008/0181529 A1 | 7/2008 | Michel et al. |
| 2008/0183730 A1 | 7/2008 | Enga |
| 2008/0238919 A1 | 10/2008 | Pack |
| 2008/0294487 A1 | 11/2008 | Nasser |
| 2009/0009123 A1 | 1/2009 | Skaff |
| 2009/0024353 A1 | 1/2009 | Lee et al. |
| 2009/0057411 A1 | 3/2009 | Madej et al. |
| 2009/0059270 A1 | 3/2009 | Opalach et al. |
| 2009/0060349 A1 | 3/2009 | Linaker et al. |
| 2009/0063306 A1 | 3/2009 | Fano et al. |
| 2009/0063307 A1 | 3/2009 | Groenovelt et al. |
| 2009/0074303 A1 | 3/2009 | Filimonova et al. |
| 2009/0088975 A1 | 4/2009 | Sato et al. |
| 2009/0103773 A1 | 4/2009 | Wheeler et al. |
| 2009/0125350 A1 | 5/2009 | Lessing et al. |
| 2009/0125535 A1 | 5/2009 | Basso et al. |
| 2009/0152391 A1 | 6/2009 | McWhirk |
| 2009/0160975 A1 | 6/2009 | Kwan |
| 2009/0192921 A1 | 7/2009 | Hicks |
| 2009/0206161 A1 | 8/2009 | Olmstead |
| 2009/0236155 A1 | 9/2009 | Skaff |
| 2009/0252437 A1 | 10/2009 | Li et al. |
| 2009/0287587 A1 | 11/2009 | Bloebaum et al. |
| 2009/0323121 A1 | 12/2009 | Valkenburg et al. |
| 2010/0017407 A1 | 1/2010 | Beniyama et al. |
| 2010/0026804 A1 | 2/2010 | Tanizaki et al. |
| 2010/0070365 A1 | 3/2010 | Siotia et al. |
| 2010/0082194 A1 | 4/2010 | Yabushita et al. |
| 2010/0091094 A1 | 4/2010 | Sekowski |
| 2010/0118116 A1 | 5/2010 | Tomasz et al. |
| 2010/0131234 A1 | 5/2010 | Stewart et al. |
| 2010/0141806 A1 | 6/2010 | Uemura et al. |
| 2010/0161569 A1 | 6/2010 | Schreter |
| 2010/0171826 A1 | 7/2010 | Hamilton et al. |
| 2010/0208039 A1 | 8/2010 | Setettner |
| 2010/0214873 A1 | 8/2010 | Somasundaram et al. |
| 2010/0235033 A1 | 9/2010 | Yamamoto et al. |
| 2010/0241289 A1 | 9/2010 | Sandberg |
| 2010/0257149 A1 | 10/2010 | Cognigni et al. |
| 2010/0295850 A1 | 11/2010 | Katz et al. |
| 2010/0315412 A1 | 12/2010 | Sinha et al. |
| 2010/0326939 A1 | 12/2010 | Clark et al. |
| 2011/0047636 A1 | 2/2011 | Stachon et al. |
| 2011/0052043 A1 | 3/2011 | Hyung et al. |
| 2011/0093306 A1 | 4/2011 | Nielsen et al. |
| 2011/0137527 A1 | 6/2011 | Simon et al. |
| 2011/0168774 A1 | 7/2011 | Magal |
| 2011/0172875 A1 | 7/2011 | Gibbs |
| 2011/0216063 A1 | 9/2011 | Hayes |
| 2011/0242286 A1 | 10/2011 | Pace et al. |
| 2011/0246503 A1 | 10/2011 | Bender et al. |
| 2011/0254840 A1 | 10/2011 | Halstead |
| 2011/0286007 A1 | 11/2011 | Pangrazio et al. |
| 2011/0288816 A1 | 11/2011 | Thierman |
| 2011/0310088 A1 | 12/2011 | Adabala et al. |
| 2012/0017028 A1 | 1/2012 | Tsirkin |
| 2012/0019393 A1 | 1/2012 | Wolinsky et al. |
| 2012/0022913 A1 | 1/2012 | Volkmann et al. |
| 2012/0051730 A1 | 3/2012 | Cote et al. |
| 2012/0069051 A1 | 3/2012 | Hagbi et al. |
| 2012/0075342 A1 | 3/2012 | Choubassi et al. |
| 2012/0133639 A1 | 5/2012 | Kopf et al. |
| 2012/0169530 A1 | 7/2012 | Padmanabhan et al. |
| 2012/0179621 A1 | 7/2012 | Moir et al. |
| 2012/0185112 A1 | 7/2012 | Sung et al. |
| 2012/0194644 A1 | 8/2012 | Newcombe et al. |
| 2012/0197464 A1 | 8/2012 | Wang et al. |
| 2012/0201466 A1 | 8/2012 | Funayama et al. |
| 2012/0209553 A1 | 8/2012 | Doytchinov et al. |
| 2012/0236119 A1 | 9/2012 | Rhee et al. |
| 2012/0249802 A1 | 10/2012 | Taylor |
| 2012/0250978 A1 | 10/2012 | Taylor |
| 2012/0269383 A1 | 10/2012 | Bobbitt et al. |
| 2012/0287249 A1 | 11/2012 | Choo et al. |
| 2012/0307108 A1 | 12/2012 | Forutanpour |
| 2012/0323620 A1 | 12/2012 | Hofman et al. |
| 2013/0030700 A1 | 1/2013 | Miller et al. |
| 2013/0076586 A1 | 3/2013 | Karhuketo et al. |
| 2013/0090881 A1 | 4/2013 | Janardhanan et al. |
| 2013/0119138 A1 | 5/2013 | Winkel |
| 2013/0132913 A1 | 5/2013 | Fu et al. |
| 2013/0134178 A1 | 5/2013 | Lu |
| 2013/0138246 A1 | 5/2013 | Gutmann et al. |
| 2013/0142421 A1 | 6/2013 | Silver et al. |
| 2013/0144565 A1 | 6/2013 | Miller et al. |
| 2013/0154802 A1 | 6/2013 | O'Haire et al. |
| 2013/0156292 A1 | 6/2013 | Chang et al. |
| 2013/0162806 A1 | 6/2013 | Ding et al. |
| 2013/0176398 A1 | 7/2013 | Bonner et al. |
| 2013/0178227 A1 | 7/2013 | Vartanian et al. |
| 2013/0182114 A1 | 7/2013 | Zhang et al. |
| 2013/0226344 A1 | 8/2013 | Wong et al. |
| 2013/0228620 A1 | 9/2013 | Ahem et al. |
| 2013/0232039 A1 | 9/2013 | Jackson et al. |
| 2013/0235165 A1 | 9/2013 | Gharib et al. |
| 2013/0235206 A1 | 9/2013 | Smith et al. |
| 2013/0236089 A1 | 9/2013 | Litvak et al. |
| 2013/0278631 A1 | 10/2013 | Border et al. |
| 2013/0299306 A1 | 11/2013 | Jiang et al. |
| 2013/0299313 A1 | 11/2013 | Baek, IV et al. |
| 2013/0300729 A1 | 11/2013 | Grimaud |
| 2013/0303193 A1 | 11/2013 | Dharwada et al. |
| 2013/0321418 A1 | 12/2013 | Kirk |
| 2013/0329013 A1 | 12/2013 | Metois et al. |
| 2013/0341400 A1 | 12/2013 | Lancaster-Larocque |
| 2014/0002597 A1 | 1/2014 | Taguchi et al. |
| 2014/0003655 A1 | 1/2014 | Gopalakrishnan et al. |
| 2014/0003727 A1 | 1/2014 | Lortz et al. |
| 2014/0006229 A1 | 1/2014 | Birch et al. |

(56) References Cited

U.S. PATENT DOCUMENTS

| | | |
|---|---|---|
| 2014/0016832 A1 | 1/2014 | Kong et al. |
| 2014/0019311 A1 | 1/2014 | Tanaka |
| 2014/0025201 A1 | 1/2014 | Ryu et al. |
| 2014/0028837 A1 | 1/2014 | Gao et al. |
| 2014/0047342 A1 | 2/2014 | Breternitz et al. |
| 2014/0049616 A1 | 2/2014 | Stettner |
| 2014/0052555 A1 | 2/2014 | Macintosh |
| 2014/0086483 A1 | 3/2014 | Zhang et al. |
| 2014/0098094 A1 | 4/2014 | Neumann et al. |
| 2014/0100813 A1 | 4/2014 | Showering |
| 2014/0104413 A1 | 4/2014 | McCloskey et al. |
| 2014/0129027 A1 | 5/2014 | Schnittman |
| 2014/0156133 A1 | 6/2014 | Cullinane et al. |
| 2014/0161359 A1 | 6/2014 | Magri et al. |
| 2014/0192050 A1 | 7/2014 | Qiu et al. |
| 2014/0195374 A1 | 7/2014 | Bassemir et al. |
| 2014/0214547 A1 | 7/2014 | Signorelli et al. |
| 2014/0214600 A1 | 7/2014 | Argue et al. |
| 2014/0267614 A1 | 9/2014 | Ding et al. |
| 2014/0267688 A1 | 9/2014 | Aich et al. |
| 2014/0277691 A1 | 9/2014 | Jacobus et al. |
| 2014/0277692 A1 | 9/2014 | Buzan et al. |
| 2014/0279294 A1 | 9/2014 | Field-Darragh et al. |
| 2014/0300637 A1 | 10/2014 | Fan et al. |
| 2014/0316875 A1 | 10/2014 | Tkachenko et al. |
| 2014/0330835 A1 | 11/2014 | Boyer |
| 2014/0344401 A1 | 11/2014 | Varney et al. |
| 2014/0351073 A1 | 11/2014 | Murphy et al. |
| 2014/0369607 A1 | 12/2014 | Patel et al. |
| 2015/0015602 A1 | 1/2015 | Beaudoin |
| 2015/0019391 A1 | 1/2015 | Kumar et al. |
| 2015/0029339 A1 | 1/2015 | Kobres et al. |
| 2015/0032304 A1 | 1/2015 | Nakamura et al. |
| 2015/0039458 A1 | 2/2015 | Reid |
| 2015/0052029 A1 | 2/2015 | Wu et al. |
| 2015/0088618 A1 | 3/2015 | Basir et al. |
| 2015/0088701 A1 | 3/2015 | Desmarais et al. |
| 2015/0088703 A1 | 3/2015 | Yan |
| 2015/0092066 A1 | 4/2015 | Geiss et al. |
| 2015/0106403 A1 | 4/2015 | Haverinen et al. |
| 2015/0117788 A1 | 4/2015 | Patel et al. |
| 2015/0139010 A1 | 5/2015 | Jeong et al. |
| 2015/0154467 A1 | 6/2015 | Feng et al. |
| 2015/0161793 A1 | 6/2015 | Takahashi |
| 2015/0170256 A1 | 6/2015 | Pettyjohn et al. |
| 2015/0181198 A1 | 6/2015 | Baele et al. |
| 2015/0212521 A1 | 7/2015 | Pack et al. |
| 2015/0235157 A1 | 8/2015 | Avegliano et al. |
| 2015/0245358 A1 | 8/2015 | Schmidt |
| 2015/0262116 A1 | 9/2015 | Katircioglu et al. |
| 2015/0279035 A1 | 10/2015 | Wolski et al. |
| 2015/0298317 A1 | 10/2015 | Wang et al. |
| 2015/0310601 A1 | 10/2015 | Rodriguez et al. |
| 2015/0332368 A1 | 11/2015 | Vartiainen et al. |
| 2015/0352721 A1 | 12/2015 | Wicks et al. |
| 2015/0363625 A1 | 12/2015 | Wu et al. |
| 2015/0363758 A1 | 12/2015 | Wu et al. |
| 2015/0365660 A1 | 12/2015 | Wu et al. |
| 2015/0379704 A1 | 12/2015 | Chandrasekar et al. |
| 2016/0012588 A1 | 1/2016 | Taguchi et al. |
| 2016/0026253 A1 | 1/2016 | Bradski et al. |
| 2016/0044862 A1 | 2/2016 | Kocer |
| 2016/0061591 A1 | 3/2016 | Pangrazio et al. |
| 2016/0070981 A1 | 3/2016 | Sasaki et al. |
| 2016/0092943 A1 | 3/2016 | Vigier et al. |
| 2016/0104041 A1 | 4/2016 | Bowers et al. |
| 2016/0107690 A1 | 4/2016 | Oyama et al. |
| 2016/0112628 A1 | 4/2016 | Super et al. |
| 2016/0114488 A1 | 4/2016 | Mascorro Medina et al. |
| 2016/0129592 A1 | 5/2016 | Saboo et al. |
| 2016/0132815 A1 | 5/2016 | Itoko et al. |
| 2016/0134930 A1* | 5/2016 | Swafford .............. A47F 5/0068 725/80 |
| 2016/0150217 A1 | 5/2016 | Popov |
| 2016/0156898 A1 | 6/2016 | Ren et al. |
| 2016/0163067 A1 | 6/2016 | Williams et al. |
| 2016/0171336 A1 | 6/2016 | Schwartz |
| 2016/0171429 A1 | 6/2016 | Schwartz |
| 2016/0171707 A1 | 6/2016 | Schwartz |
| 2016/0185347 A1 | 6/2016 | Lefevre et al. |
| 2016/0191759 A1 | 6/2016 | Somanath et al. |
| 2016/0224927 A1 | 8/2016 | Pettersson |
| 2016/0253735 A1 | 9/2016 | Scudillo et al. |
| 2016/0253844 A1 | 9/2016 | Petrovskaya et al. |
| 2016/0259983 A1* | 9/2016 | Tani .................... G06K 9/4647 |
| 2016/0260054 A1 | 9/2016 | High et al. |
| 2016/0271795 A1 | 9/2016 | Vicenti |
| 2016/0313133 A1 | 10/2016 | Zeng et al. |
| 2016/0328618 A1 | 11/2016 | Patel et al. |
| 2016/0328767 A1 | 11/2016 | Bonner et al. |
| 2016/0353099 A1 | 12/2016 | Thomson et al. |
| 2016/0364634 A1 | 12/2016 | Davis et al. |
| 2017/0004649 A1 | 1/2017 | Collet Romea et al. |
| 2017/0011281 A1 | 1/2017 | Dijkman et al. |
| 2017/0011308 A1 | 1/2017 | Sun et al. |
| 2017/0032311 A1 | 2/2017 | Rizzolo et al. |
| 2017/0041553 A1 | 2/2017 | Cao et al. |
| 2017/0054965 A1 | 2/2017 | Raab et al. |
| 2017/0066459 A1 | 3/2017 | Singh |
| 2017/0074659 A1 | 3/2017 | Giurgiu et al. |
| 2017/0109940 A1 | 4/2017 | Guo et al. |
| 2017/0147966 A1 | 5/2017 | Aversa et al. |
| 2017/0150129 A1 | 5/2017 | Pangrazio |
| 2017/0178060 A1 | 6/2017 | Schwartz |
| 2017/0178227 A1 | 6/2017 | Gornish |
| 2017/0178310 A1 | 6/2017 | Gornish |
| 2017/0193434 A1 | 7/2017 | Shah et al. |
| 2017/0219338 A1 | 8/2017 | Brown et al. |
| 2017/0219353 A1 | 8/2017 | Alesiani |
| 2017/0227645 A1 | 8/2017 | Swope et al. |
| 2017/0227647 A1 | 8/2017 | Baik |
| 2017/0228885 A1 | 8/2017 | Baumgartner |
| 2017/0261993 A1 | 9/2017 | Venable et al. |
| 2017/0262724 A1 | 9/2017 | Wu et al. |
| 2017/0280125 A1 | 9/2017 | Brown et al. |
| 2017/0286773 A1 | 10/2017 | Skaff et al. |
| 2017/0286901 A1* | 10/2017 | Skaff .................... G05D 1/0246 |
| 2017/0323253 A1 | 11/2017 | Enssle et al. |
| 2017/0323376 A1 | 11/2017 | Glaser et al. |
| 2017/0337508 A1 | 11/2017 | Bogolea et al. |
| 2017/0372481 A1* | 12/2017 | Onuki .................... G06T 7/00 |
| 2018/0001481 A1 | 1/2018 | Shah et al. |
| 2018/0005035 A1 | 1/2018 | Bogolea et al. |
| 2018/0005176 A1 | 1/2018 | Williams et al. |
| 2018/0020145 A1 | 1/2018 | Kotfis et al. |
| 2018/0051991 A1 | 2/2018 | Hong |
| 2018/0053091 A1 | 2/2018 | Savvides et al. |
| 2018/0053305 A1 | 2/2018 | Gu et al. |
| 2018/0075403 A1 | 3/2018 | Mascorro Medina et al. |
| 2018/0089613 A1 | 3/2018 | Chen et al. |
| 2018/0101813 A1 | 4/2018 | Paat et al. |
| 2018/0108120 A1* | 4/2018 | Venable ................ G06T 3/4038 |
| 2018/0108134 A1 | 4/2018 | Venable et al. |
| 2018/0114183 A1 | 4/2018 | Howell |
| 2018/0130011 A1 | 5/2018 | Jacobsson |
| 2018/0143003 A1 | 5/2018 | Clayton et al. |
| 2018/0174325 A1 | 6/2018 | Fu et al. |
| 2018/0190160 A1 | 7/2018 | Bryan et al. |
| 2018/0197139 A1 | 7/2018 | Hill |
| 2018/0201423 A1 | 7/2018 | Drzewiecki et al. |
| 2018/0204111 A1 | 7/2018 | Zadeh et al. |
| 2018/0251253 A1 | 9/2018 | Taira et al. |
| 2018/0276596 A1 | 9/2018 | Murthy et al. |
| 2018/0281191 A1 | 10/2018 | Sinyavskiy et al. |
| 2018/0293442 A1 | 10/2018 | Fridental et al. |
| 2018/0293543 A1 | 10/2018 | Tiwari |
| 2018/0306958 A1 | 10/2018 | Goss et al. |
| 2018/0313956 A1 | 11/2018 | Rzeszutek et al. |
| 2018/0314260 A1 | 11/2018 | Jen et al. |
| 2018/0314908 A1 | 11/2018 | Lam |
| 2018/0315007 A1 | 11/2018 | Kingsford et al. |
| 2018/0315065 A1 | 11/2018 | Zhang et al. |

(56) References Cited

U.S. PATENT DOCUMENTS

| | | | |
|---|---|---|---|
| 2018/0315173 A1 | 11/2018 | Phan et al. | |
| 2018/0315865 A1 | 11/2018 | Haist et al. | |
| 2018/0370727 A1 | 12/2018 | Hance et al. | |
| 2019/0034864 A1* | 1/2019 | Skaff | G06K 7/1413 |
| 2019/0057588 A1 | 2/2019 | Savvides et al. | |
| 2019/0065861 A1 | 2/2019 | Savvides et al. | |
| 2019/0073554 A1 | 3/2019 | Rzeszutek | |
| 2019/0073559 A1 | 3/2019 | Rzeszutek et al. | |
| 2019/0073627 A1 | 3/2019 | Nakdimon et al. | |
| 2019/0077015 A1 | 3/2019 | Shibasaki et al. | |
| 2019/0087663 A1 | 3/2019 | Yamazaki et al. | |
| 2019/0094876 A1 | 3/2019 | Moore et al. | |
| 2019/0108606 A1 | 4/2019 | Komiyama | |
| 2019/0178436 A1 | 6/2019 | Mao et al. | |
| 2019/0180150 A1* | 6/2019 | Taylor | G06T 3/0062 |
| 2019/0197439 A1 | 6/2019 | Wang | |
| 2019/0197728 A1 | 6/2019 | Yamao | |
| 2019/0236530 A1 | 8/2019 | Cantrell et al. | |
| 2019/0282000 A1* | 9/2019 | Swafford | A47F 10/02 |
| 2019/0304132 A1 | 10/2019 | Yoda et al. | |
| 2019/0310652 A1* | 10/2019 | Cao | G05D 1/0251 |
| 2019/0311486 A1* | 10/2019 | Phan | G06T 7/50 |
| 2019/0392212 A1 | 12/2019 | Sawhney et al. | |
| 2020/0118063 A1* | 4/2020 | Fu | G06F 15/76 |
| 2020/0249692 A1* | 8/2020 | Thode | B66F 9/0755 |
| 2020/0279113 A1* | 9/2020 | Yanagi | G06Q 30/00 |
| 2020/0293766 A1* | 9/2020 | Huang | G06T 7/251 |
| 2020/0314333 A1 | 10/2020 | Liang et al. | |
| 2020/0334620 A1* | 10/2020 | Yanagi | G06Q 30/06 |
| 2020/0380706 A1* | 12/2020 | Gorodetsky | G06K 9/6209 |
| 2020/0380715 A1* | 12/2020 | Chan | G01S 17/86 |
| 2021/0004610 A1* | 1/2021 | Huang | G01S 17/89 |

FOREIGN PATENT DOCUMENTS

| | | |
|---|---|---|
| CN | 104200086 | 12/2014 |
| CN | 107067382 | 8/2017 |
| CN | 206952978 | 2/2018 |
| EP | 766098 | 4/1997 |
| EP | 1311993 | 5/2007 |
| EP | 2309378 | 4/2011 |
| EP | 2439487 | 4/2012 |
| EP | 2472475 | 7/2012 |
| EP | 2562688 | 2/2013 |
| EP | 2662831 | 11/2013 |
| EP | 2693362 | 2/2014 |
| GB | 2323238 | 9/1998 |
| GB | 2330265 | 4/1999 |
| JP | 2014170431 | 9/2014 |
| KR | 101234798 | 1/2009 |
| KR | 1020190031431 | 3/2019 |
| WO | WO 99/23600 | 5/1999 |
| WO | WO 2003002935 | 1/2003 |
| WO | WO 2003025805 | 3/2003 |
| WO | WO 2006136958 | 12/2006 |
| WO | WO 2007042251 | 4/2007 |
| WO | WO 2008057504 | 5/2008 |
| WO | WO 2008154611 | 12/2008 |
| WO | WO 2012103199 | 8/2012 |
| WO | WO 2012103202 | 8/2012 |
| WO | WO 2012154801 | 11/2012 |
| WO | WO 2013165674 | 11/2013 |
| WO | WO 2014066422 | 5/2014 |
| WO | WO 2014092552 | 6/2014 |
| WO | WO 2014181323 | 11/2014 |
| WO | WO 2015127503 | 9/2015 |
| WO | WO 2016020038 | 2/2016 |
| WO | WO 2017187106 | 11/2017 |
| WO | WO 2018018007 | 1/2018 |
| WO | WO 2018204308 | 11/2018 |
| WO | WO 2018204342 | 11/2018 |
| WO | WO 2019023249 | 1/2019 |

OTHER PUBLICATIONS

Duda, et al., "Use of the Hough Transformation to Detect Lines and Curves in Pictures", Stanford Research Institute, Menlo Park, California, Graphics and Image Processing, Communications of the ACM, vol. 15, No. 1 (Jan. 1972).
F.C.A. Groen et al., "The smallest box around a package," Pattern Recognition, vol. 14, No. 1-6, Jan. 1, 1981, pp. 173-176, XP055237156, GB, ISSN: 0031-3203, DOI: 10.1016/0031-3203(81(90059-5 p. 176-p. 178.
Federico Tombari et al. "Multimodal cue integration through Hypotheses Verification for RGB-D object recognition and 6DOF pose estimation", IEEE International Conference on Robotics and Automation, Jan. 2013.
Flores, et al., "Removing Pedestrians from Google Street View Images", Computer Vision and Pattern Recognition Workshops, 2010 IEEE Computer Society Conference On, IEE, Piscataway, NJ, pp. 53-58 (Jun. 13, 2010).
Glassner, "Space Subdivision for Fast Ray Tracing." IEEE Computer Graphics and Applications, 4.10, pp. 15-24, 1984.
Golovinskiy, Aleksey, et al. "Min-Cut based segmentation of point clouds." Computer Vision Workshops (ICCV Workshops), 2009 IEEE 12th International Conference on. IEEE, 2009.
Hackel et al., "Contour Detection in unstructured 3D point clouds,"IEEE, 2016 Conference on Computer vision and Pattern recognition (CVPR), Jun. 27-30, 2016, pp. 1-9.
Hao et al., "Structure-based object detection from scene point clouds," Science Direct, V191, pp. 148-160 (2016).
Hu et al., "An improved method of discrete point cloud filtering based on complex environment," International Journal of Applied Mathematics and Statistics, v48, i18 (2013).
International Search Report and Written Opinion for International Patent Application No. PCT/US2013/070996 dated Apr. 2, 2014.
International Search Report and Written Opinion for International Patent Application No. PCT/US2013/053212 dated Dec. 1, 2014.
International Search Report and Written Opinion for corresponding International Patent Application No. PCT/US2016/064110 dated Mar. 20, 2017.
International Search Report and Written Opinion for corresponding International Patent Application No. PCT/US2017/024847 dated Jul. 7, 2017.
International Search Report and Written Opinion for International Application No. PCT/US2018/030419 dated Aug. 31, 2018.
International Search Report and Written Opinion from International Patent Application No. PCT/US2018/030345 dated Sep. 17, 2018.
International Search Report and Written Opinion from International Patent Application No. PCT/US2018/030360 dated Jul. 9, 2018.
International Search Report and Written Opinion from International Patent Application No. PCT/US2018/030363 dated Jul. 9, 2018.
International Search Report and Written Opinion for International Application No. PCT/US2019/025859 dated Jul. 3, 2019.
International Search Report and Written Opinion from International Patent Application No. PCT/US2019/025849 dated Jul. 9, 2019.
International Search Report and Written Opinion from International Patent Application No. PCT/US2019/049761 dated Nov. 15, 2019.
International Search Report and Written Opinion from International Patent Application No. PCT/US2019/051312 dated Nov. 15, 2019.
International Search Report and Written Opinion from International Patent Application No. PCT/US2019/054103 dated Jan. 6, 2020.
International Search Report and Written Opinion from International Patent Application No. PCT/US2019/064020 dated Feb. 19, 2020.
International Search Report and Written Opinion for International Patent Application No. PCT/US2020/028133 dated Jul. 24, 2020.
International Search Report and Written Opinion from International Patent Application No. PCT/US2020/029134 dated Jul. 27, 2020.
International Search Report and Written Opinion from International Patent Application No. PCT/US2020/028183 dated Jul. 24, 2020.
International Search Report and Written Opinion from International Patent Application No. PCT/US2020/035285 dated Aug. 27, 2020.
Jadhav et al. "Survey on Spatial Domain dynamic template matching technique for scanning linear barcode," International Journal of science and research v 5 n 3, Mar. 2016)(Year: 2016).

(56) References Cited

OTHER PUBLICATIONS

Jian Fan et al.: "Shelf detection via vanishing point and radial projection", 2014 IEEE International Conference on image processing (ICIP), IEEE, (Oct. 27, 2014), pp. 1575-1578.
Kang et al., "Kinematic Path-Tracking of Mobile Robot Using Iterative learning Control", Journal of Robotic Systems, 2005, pp. 111-121.
Kay et al. "Ray Tracing Complex Scenes." Acm Siggraph Computer Graphics, vol. 20, No. 4, ACM, pp. 269-278, 1986.
Kelly et al., "Reactive Nonholonomic Trajectory Generation via Parametric Optimal Control", International Journal of Robotics Research, vol. 22, No. 7-8, pp. 583-601 (Jul. 30, 2013).
Lari, Z., et al., "An adaptive approach for segmentation of 3D laser point cloud." International Archives of the Photogrammertry, Remote sensing and spatial information Sciences, vol. XXXVIII-5/W12, 2011, ISPRS Calgary 2011 Workshop, Aug. 29-31, 2011, Calgary, Canada.
Lecking et al.: "Localization in a wide range of industrial environments using relative 3D ceiling features", IEEE, pp. 333-337 (Sep. 15, 2008).
Lee et al. "Statistically Optimized Sampling for Distributed Ray Tracing." ACM Siggraph Computer Graphics, vol. 19, No. 3, ACM, pp. 61-67, 1985.
Li et al., "An improved RANSAC for 3D Point cloud plane segmentation based on normal distribution transformation cells," Remote sensing, V9: 433, pp. 1-16 (2017).
Likhachev, Maxim, and Dave Ferguson. "Planning Long dynamically feasible maneuvers for autonomous vehicles." The international journal of Robotics Reasearch 28.8 (2009): 933-945. (Year:2009).
Marder-Eppstein et al., "The Office Marathon: robust navigation in an indoor office environment," IEEE, 2010 International conference on robotics and automation, May 3-7, 2010, pp. 300-307.
Mcnaughton, Matthew, et al. "Motion planning for autonomous driving with a conformal spatiotemporal lattice." Robotics and Automation (ICRA), 2011 IEEE International Conference on. IEEE, 2011. (Year: 2011).
Meyersohn, "Walmart turns to robots and apps in stores", https://www.cnn.com/2018/12/07/business/walmart-robot-janitors-dotcom-store/index.html, Oct. 29, 2019.
Mitra et al., "Estimating surface normals in noisy point cloud data," International Journal of Computational geometry & applications, Jun. 8-10, 2003, pp. 322-328.
N.D.F. Campbell et al. "Automatic 3D Object Segmentation in Multiple Views using Volumetric Graph-Cuts", Journal of Image and Vision Computing, vol. 28, Issue 1, Jan. 2010, pp. 14-25.
Ni et al., "Edge Detection and Feature Line Tracing in 3D-Point Clouds by Analyzing Geometric Properties of Neighborhoods," Remote Sensing, V8 19, pp. 1-20 (2016).
Norriof et al., "Experimental comparison of some classical iterative learning control algorithms", IEEE Transactions on Robotics and Automation, Jun. 2002, pp. 636-641.
Notice of allowance for U.S. Appl. No. 13/568,175 dated Sep. 23, 2014.
Notice of allowance for U.S. Appl. No. 13/693,503 dated Mar. 11, 2016.
Notice of allowance for U.S. Appl. No. 14/068,495 dated Apr. 25, 2016.
Notice of allowance for U.S. Appl. No. 14/518,091 dated Apr. 12, 2017.
Notice of allowance for U.S. Appl. No. 15/211,103 dated Apr. 5, 2017.
Olson, Clark F., et al. "Wide-Baseline Stereo Vision for terrain Mapping" in Machine Vision and Applications, Aug. 2010.
Oriolo et al., "An iterative learning controller for nonholonomic mobile Robots", the international Journal of Robotics Research, Aug. 1997, pp. 954-970.
Ostafew et al., "Visual Teach and Repeat, Repeat, Repeat: Iterative learning control to improve mobile robot path tracking in challenging outdoor environment", IEEE/RSJ International Conference on Intelligent robots and Systems, Nov. 2013, p. 176-.
Park et al., "Autonomous mobile robot navigation using passive rfid in indoor environment," IEEE, Transactions on industrial electronics, vol. 56, issue 7, pp. 2366-2373 (Jul. 2009).
Perveen et al. (An overview of template matching methodologies and its application, International Journal of Research in Computer and Communication Technology, v2n10, Oct. 2013) (Year: 2013).
Pivtoraiko et al., "Differentially constrained mobile robot motion planning in state lattices", journal of field robotics, vol. 26, No. 3, 2009, pp. 308-333.
Pratt W K Ed: "Digital Image processing, 10-image enhancement, 17-image segmentation", 2001-01-01, Digital Image Processing: PIKS Inside, New York: John Wily & Sons, US, pp. 243-258, 551.
Puwein, J., et al."Robust Multi-view camera calibration for wide-baseline camera networks,"in IEEE Workshop on Applications of computer vision (WACV), Jan. 2011.
Rusu, et al. "How to incrementally register pairs of clouds," PCL Library, retrieved from internet on Aug. 22, 2016 [http://pointclouds.org/documentation/tutorials/pairwise_incremental_registration.php.
Rusu, et al. "Spatial Change detection on unorganized point cloud data," PCL Library, retrieved from internet on Aug. 19, 2016 [http://pointclouds.org/documentation/tutorials/octree_change.php].
Schnabel et al. "Efficient RANSAC for Point-Cloud Shape Detection", vol. 0, No. 0, pp. 1-12 (1981).
Senthilkumaran, et al., "Edge Detection Techniques for Image Segmentation-A Survey of Soft Computing Approaches", International Journal of Recent Trends in Engineering, vol. 1, No. 2 (May 2009).
Szeliski, "Modified Hough Transform", Computer Vision. Copyright 2011, pp. 251-254. Retrieved on Aug. 17, 2017 [http://szeliski.org/book/drafts/SzeliskiBook_20100903_draft.pdf].
Tahir, Rabbani, et al., "Segmentation of point clouds using smoothness constraint,"International Archives of Photogrammetry, Remote Sensing and Spatial Information Sciences 36.5 (Sep. 2006): 248-253.
Trevor et al., "Tables, Counters, and Shelves: Semantic Mapping of Surfaces in 3D," Retrieved from Internet Jul. 3, 2018 @ http://citeseerx.ist.psu.edu/viewdoc/download?doi=10.1.1.703.5365&rep=repl&type=p.
Tseng, et al., "A Cloud Removal Approach for Aerial Image Visualization", International Journal of Innovative Computing, Information & Control, vol. 9, No. 6, pp. 2421-2440 (Jun. 2013).
Uchiyama, et al., "Removal of Moving Objects from a Street-View Image by Fusing Multiple Image Sequences", Pattern Recognition, 2010, 20th International Conference On, IEEE, Piscataway, NJ pp. 3456-3459 (Aug. 23, 2010).
United Kingdom Intellectual Property Office, "Combined Search and Examination Report" for GB Patent Application No. 1813580.6 dated Feb. 21, 2019.
United Kingdom Intellectual Property Office, Combined Search and Examination Report dated Jan. 22, 2016 for GB Patent Application No. 1417218.3.
United Kingdom Intellectual Property Office, Combined Search and Examination Report dated Jan. 22, 2016 for GB Patent Application No. 1521272.3.
United Kingdom Intellectual Property Office, Combined Search and Examination Report dated Mar. 11, 2015 for GB Patent Application No. 1417218.3.
United Kingdom Intellectual Property Office, Combined Search and Examination Report dated May 13, 2020 for GB Patent Application No. 1917864.9.
Varol Gul et al.: "Product placement detection based on image processing", 2014 22nd Signal Processing and Communication Applications Conference (SIU), IEEE, 2014-04-23.
Varol Gul et al.: "Toward Retail product recognition on Grocery shelves", Visual Communications and image processing; Jan. 20, 2004; San Jose, (Mar. 4, 2015).
Weber et al., "Methods for Feature Detection in Point clouds," visualization of large and unstructured data sets—IRTG Workshop, pp. 90-99 (2010).

(56) References Cited

OTHER PUBLICATIONS

Zhao Zhou et al.: "An Image contrast Enhancement Algorithm Using PLIP-based histogram Modification", 2017 3rd IEEE International Conference on Cybernetics (Cybcon), IEEE, (2017-06-21).
Ziang Xie et al., "Multimodal Blending for High-Accuracy Instance Recognition", 2013 IEEE RSJ International Conference on Intelligent Robots and Systems, p. 2214-2221.
Fan Zhang et al., "Parallax-tolerant Image Stitching", 2014 Computer Vision Foundation, pp. 4321-4328.
Kaimo Lin et al., "SEAGULL: Seam-guided Local Alignment for Parallax-tolerant Image Stitching", Retrieved on Nov. 16, 2020 [http://publish.illinois.edu/visual-modeling-and-analytics/files/2016/08/Seagull.pdf].
Julio Zaragoza et al., "As-Projective-As-Possible Image Stitching with Moving DLT", 2013 Computer Vision Foundation, pp. 2339-2346.
Zeng et al., Multi-view Self Supervised Deep Learning for 6D Pose Estimation in the Amazon Picking Challenge, May 7, 2017. Retrieved on Nov. 16, 2019 [https://arxiv.org/pdf/1609.09475.pdf].
"Fair Billing with Automatic Dimensioning" pp. 1-4, undated, Copyright Mettler-Toledo International Inc.
"Plane Detection in Point Cloud Data" dated 2010-01-25 by Michael Ying Yang and Wolfgang Forstner, Technical Report 1, 2010, University of Bonn.
"Swift Dimension" Trademark Omniplanar, Copyright 2014.
Ajmal S. Mian et al., "Three-Dimensional Model Based Object Recognition and Segmentation in Cluttered Scenes", IEEE Transactions on Pattern Analysis and Machine Intelligence, vol. 28, No. 10, Oct. 2006.
Batalin et al., "Mobile robot navigation using a sensor network," IEEE, International Conference on robotics and automation, Apr. 26, May 1, 2004, pp. 636-641.
Bazazian et al., "Fast and Robust Edge Extraction in Unorganized Point clouds," IEEE, 2015 International Conference on Digital Image Computing: Techniques and Applicatoins (DICTA), Nov. 23-25, 2015, pp. 1-8.
Biswas et al. "Depth Camera Based Indoor Mobile Robot Localization and Navigation" Robotics and Automation (ICRA), 2012 IEEE International Conference on IEEE, 2012.
Bohm, Multi-Image Fusion for Occlusion-Free Faade Texturing, International Archives of the Photogrammetry, Remote Sensing and Spatial Information Sciences, pp. 867-872 (Jan. 2004).
Bristow et al., "A Survey of Iterative Learning Control", IEEE Control Systems, Jun. 2006, pp. 96-114.
Buenaposada et al. "Realtime tracking and estimation of plane pose" Proceedings of the ICPR (Aug. 2002) vol. II, IEEE pp. 697-700.
Carreira et al., "Enhanced PCA-based localization using depth maps with missing data," IEEE, pp. 1-8, Apr. 24, 2013.
Chen et al. "Improving Octree-Based Occupancy Maps Using Environment Sparsity with Application to Aerial Robot Navigation" Robotics and Automation (ICRA), 2017 IEEE.
Cleveland Jonas et al.: "Automated System for Semantic Object Labeling with Soft-Object Recognition and Dynamic Programming Segmentation", IEEE Transactions on Automation Science and Engineering, IEEE Service Center, New York, NY (2017-04-01).
Cook et al., "Distributed Ray Tracing ACM SIGGRAPH Computer Graphics", vol. 18, No. 3, ACM pp. 137-145, 1984.
Datta, A., et al. "Accurate camera calibration using iterative refinement of control points," in Computer Vision Workshops (ICCV Workshops), 2009.
Deschaud, et al., "A Fast and Accurate Place Detection algoritm for large noisy point clouds using filtered normals and voxel growing," 3DPVT, May 2010, Paris, France, [hal-01097361].
Douillard, Bertrand, et al. "On the segmentation of 3D Lidar point clouds." Robotics and Automation (ICRA), 2011 IEEE International Conference on IEEE, 2011.

* cited by examiner

METHOD, SYSTEM AND APPARATUS FOR END OF AISLE DETECTION

BACKGROUND

Environments in which objects are managed, such as retail facilities, warehousing and distribution facilities, and the like, may store such objects in regions such as aisles of shelf modules or the like. For example, a retail facility may include objects such as products for purchase, and a distribution facility may include objects such as parcels or pallets. For example, a given environment may contain a wide variety of objects with different sizes, shapes, and other attributes. Such objects may be supported on shelves in a variety of positions and orientations. The variable position and orientation of the objects, as well as variations in lighting and the placement of labels and other indicia on the objects and the shelves, can render detection of structural features, such as the ends of the aisles, difficult.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
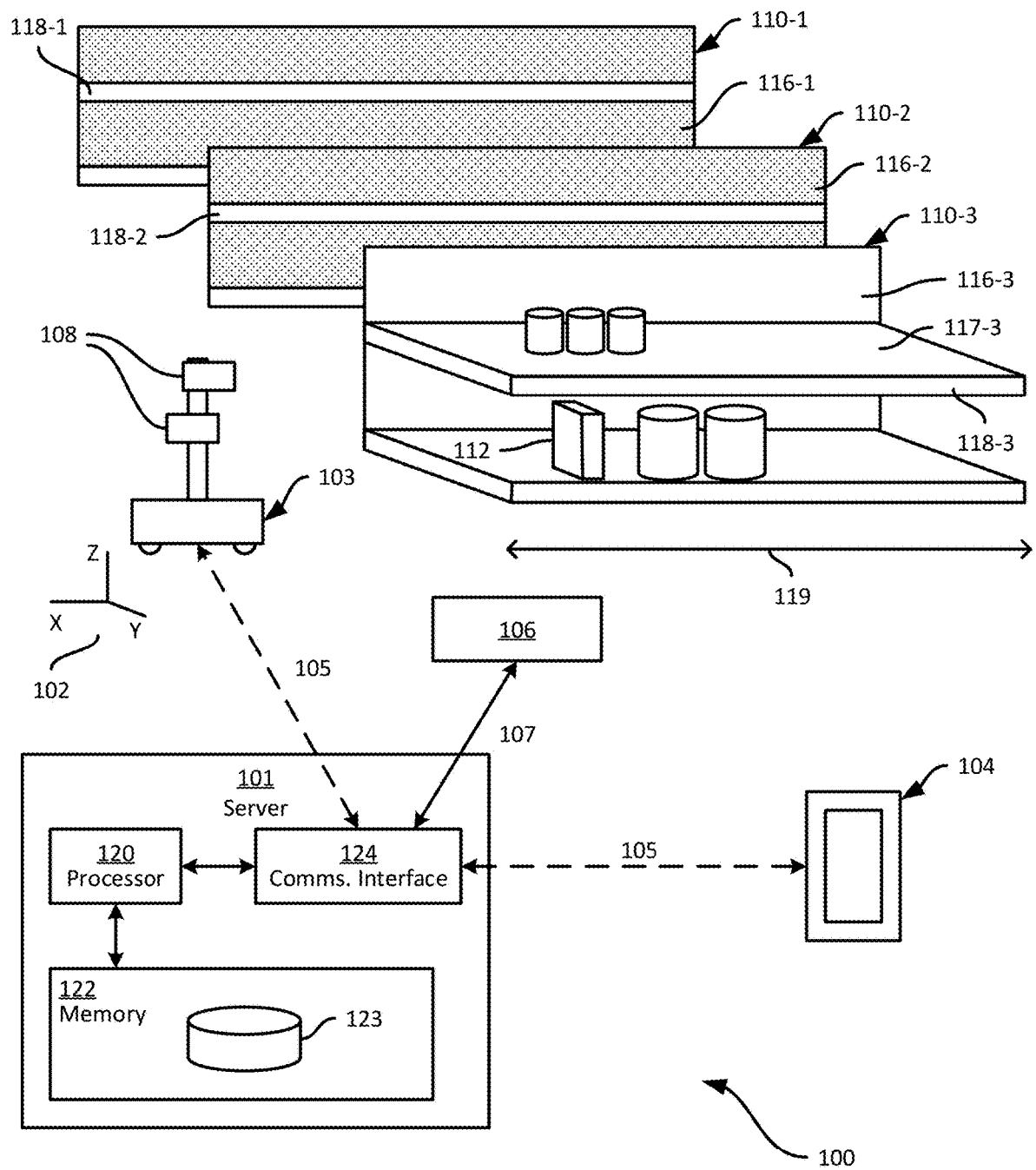
FIG. 1 is a schematic of a mobile automation system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method of detecting an end of an aisle of shelf modules in an imaging controller of a mobile automation apparatus, the method comprising: obtaining image data captured by an image sensor and a plurality of depth measurements captured by a depth sensor, the image data and the depth measurements corresponding to an area containing a portion of the aisle of shelf modules; obtaining locomotive data of the apparatus; generating a dynamic trust region based on the locomotive data; detecting an edge segment based on the image data and the plurality of depth measurements, the edge segment representing an edge of a support surface; and when the edge segment is located at least partially in the dynamic trust region, updating an estimated end of the aisle based on the detected edge segment.

Additional examples disclosed herein are directed to a mobile automation apparatus comprising: a locomotive assembly; an image sensor and a depth sensor; and an imaging controller configured to: obtain image data captured by an image sensor and a plurality of depth measurements captured by a depth sensor, the image data and the depth measurements corresponding to an area containing a portion of the aisle of shelf modules; obtain locomotive data of the apparatus; generate a dynamic trust region based on the locomotive data; detect an edge segment based on the image data and the plurality of depth measurements, the edge segment representing an edge of a support surface; and when the edge segment is located at least partially in the dynamic trust region, update an estimated end of the aisle based on the detected edge segment.

FIG. 1 depicts a mobile automation system 100 in accordance with the teachings of this disclosure. The system 100 includes a server 101 in communication with at least one mobile automation apparatus 103 (also referred to herein simply as the apparatus 103) and at least one client computing device 104 via communication links 105, illustrated in the present example as including wireless links. In the present example, the links 105 are provided by a wireless local area network (WLAN) deployed via one or more access points (not shown). In other examples, the server 101, the client device 104, or both, are located remotely (i.e. outside the environment in which the apparatus 103 is deployed), and the links 105 therefore include wide-area networks such as the Internet, mobile networks, and the like. The system 100 also includes a dock 106 for the apparatus 103 in the present example. The dock 106 is in communication with the server 101 via a link 107 that in the present example is a wired link. In other examples, however, the link 107 is a wireless link.

The client computing device 104 is illustrated in FIG. 1 as a mobile computing device, such as a tablet, smart phone or the like. In other examples, the client device 104 is implemented as another type of computing device, such as a desktop computer, a laptop computer, another server, a kiosk, a monitor, and the like. The system 100 can include a plurality of client devices 104 in communication with the server 101 via respective links 105.

The system 100 is deployed, in the illustrated example, in a retail facility including a plurality of support structures such as shelf modules 110-1, 110-2, 110-3 and so on (collectively referred to as shelf modules 110 or shelves 110, and generically referred to as a shelf module 110 or shelf 110—this nomenclature is also employed for other elements discussed herein). Each shelf module 110 supports a plurality of products 112. Each shelf module 110 includes a shelf back 116-1, 116-2, 116-3 and a support surface (e.g. support surface 117-3 as illustrated in FIG. 1) extending from the shelf back 116 to a shelf edge 118-1, 118-2, 118-3.

The shelf modules 110 (also referred to as sub-regions of the facility) are typically arranged in a plurality of aisles (also referred to as regions of the facility), each of which includes a plurality of modules 110 aligned end-to-end. In such arrangements, the shelf edges 118 face into the aisles, through which customers in the retail facility, as well as the apparatus 103, may travel. As will be apparent from FIG. 1, the term "shelf edge" 118 as employed herein, which may also be referred to as the edge of a support surface (e.g., the support surfaces 117) refers to a surface bounded by adjacent surfaces having different angles of inclination. In the example illustrated in FIG. 1, the shelf edge 118-3 is at an angle of about ninety degrees relative to the support surface 117-3 and to the underside (not shown) of the support surface 117-3. In other examples, the angles between the shelf edge 118-3 and the adjacent surfaces, such as the support surface 117-3, is more or less than ninety degrees.

The apparatus 103 is equipped with a plurality of navigation and data capture sensors 108, such as image sensors (e.g. one or more digital cameras) and depth sensors (e.g. one or more Light Detection and Ranging (LIDAR) sensors, one or more depth cameras employing structured light patterns, such as infrared light, or the like). The apparatus 103 is deployed within the retail facility and, via communication with the server 101 and use of the sensors 108, navigates autonomously or partially autonomously along a length 119 of at least a portion of the shelves 110.

While navigating among the shelves 110, the apparatus 103 can capture images, depth measurements and the like, representing the shelves 110 (generally referred to as shelf data or captured data). Navigation may be performed according to a frame of reference 102 established within the retail facility. The apparatus 103 therefore tracks its pose (i.e. location and orientation) in the frame of reference 102. The apparatus 103 can navigate the facility by generating paths from origin locations to destination locations. For example, to traverse an aisle while capturing data representing the shelves 110 of that aisle, the apparatus 103 can generate a path that traverses the aisle.

The server 101 includes a special purpose controller, such as a processor 120, specifically designed to control and/or assist the mobile automation apparatus 103 to navigate the environment and to capture data. The processor 120 is interconnected with a non-transitory computer readable storage medium, such as a memory 122, having stored thereon computer readable instructions for performing various functionality, including control of the apparatus 103 to navigate the modules 110 and capture shelf data, as well as post-processing of the shelf data. The memory 122 can also store data for use in the above-mentioned control of the apparatus 103, such as a repository 123 containing a map of the retail environment and any other suitable data (e.g. operational constraints for use in controlling the apparatus 103, data captured by the apparatus 103, and the like).

The memory 122 includes a combination of volatile memory (e.g. Random Access Memory or RAM) and non-volatile memory (e.g. read only memory or ROM, Electrically Erasable Programmable Read Only Memory or EEPROM, flash memory). The processor 120 and the memory 122 each comprise one or more integrated circuits. In some embodiments, the processor 120 is implemented as one or more central processing units (CPUs) and/or graphics processing units (GPUs).

The server 101 also includes a communications interface 124 interconnected with the processor 120. The communications interface 124 includes suitable hardware (e.g. transmitters, receivers, network interface controllers and the like) allowing the server 101 to communicate with other computing devices—particularly the apparatus 103, the client device 104 and the dock 106—via the links 105 and 107. The links 105 and 107 may be direct links, or links that traverse one or more networks, including both local and wide-area networks. The specific components of the communications interface 124 are selected based on the type of network or other links that the server 101 is required to communicate over. In the present example, as noted earlier, a wireless local-area network is implemented within the retail facility via the deployment of one or more wireless access points. The links 105 therefore include either or both wireless links between the apparatus 103 and the mobile device 104 and the above-mentioned access points, and a wired link (e.g. an Ethernet-based link) between the server 101 and the access point.

The processor 120 can therefore obtain data captured by the apparatus 103 via the communications interface 124 for storage (e.g. in the repository 123) and subsequent processing (e.g. to detect objects such as shelved products in the captured data, and detect status information corresponding to the objects). The server 101 may also transmit status notifications (e.g. notifications indicating that products are out-of-stock, in low stock or misplaced) to the client device 104 responsive to the determination of product status data. The client device 104 includes one or more controllers (e.g. central processing units (CPUs) and/or field-programmable gate arrays (FPGAs) and the like) configured to process (e.g. to display) notifications received from the server 101.

Figure 2:
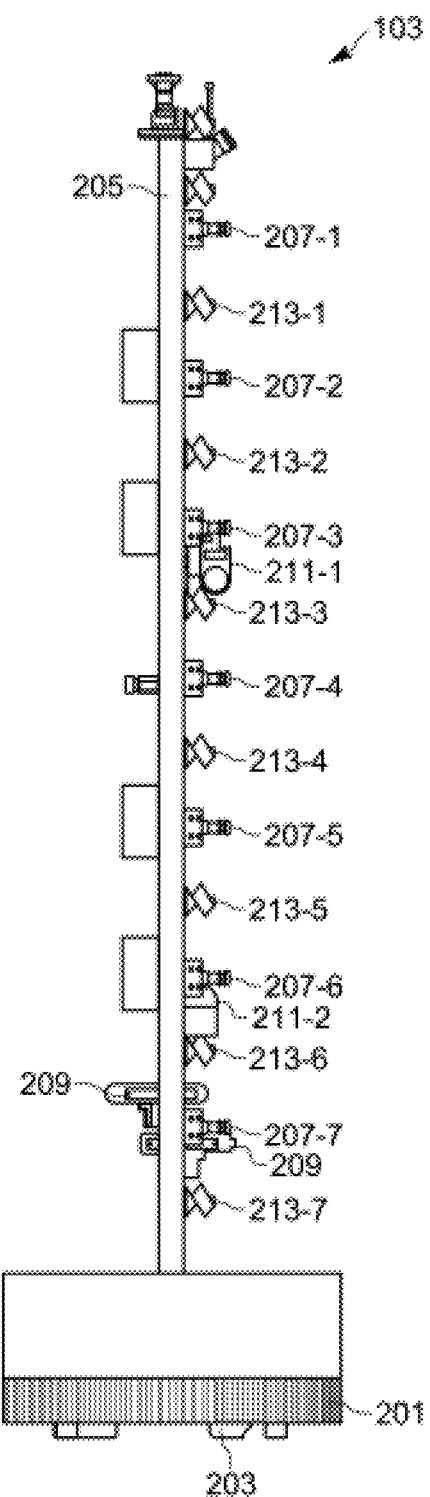
FIG. 2 depicts a mobile automation apparatus in the system of FIG. 1.

Turning now to FIG. 2, the mobile automation apparatus 103 is shown in greater detail. The apparatus 103 includes a chassis 201 containing a locomotive assembly 203 (e.g. one or more electrical motors driving wheels, tracks or the like). The apparatus 103 further includes a sensor mast 205 supported on the chassis 201 and, in the present example, extending upwards (e.g., substantially vertically) from the chassis 201. The mast 205 supports the sensors 108 mentioned earlier. In particular, the sensors 108 include at least one imaging sensor 207, such as a digital camera. In the present example, the mast 205 supports seven digital cameras 207-1 through 207-7 oriented to face the shelves 110.

The mast 205 also supports at least one depth sensor 209, such as a 3D digital camera capable of capturing both depth data and image data. The apparatus 103 also includes additional depth sensors, such as LIDAR sensors 211. In the present example, the mast 205 supports two LIDAR sensors 211-1 and 211-2. As shown in FIG. 2, the cameras 207 and the LIDAR sensors 211 are arranged on one side of the mast 205, while the depth sensor 209 is arranged on a front of the mast 205. That is, the depth sensor 209 is forward-facing (i.e. captures data in the direction of travel of the apparatus 103), while the cameras 207 and LIDAR sensors 211 are side-facing (i.e. capture data alongside the apparatus 103, in a direction perpendicular to the direction of travel). In other examples, the apparatus 103 includes additional sensors, such as one or more RFID readers, temperature sensors, and the like.

The mast 205 also supports a plurality of illumination assemblies 213, configured to illuminate the fields of view of the respective cameras 207. That is, the illumination assembly 213-1 illuminates the field of view of the camera 207-1, and so on. The cameras 207 and lidars 211 are oriented on the mast 205 such that the fields of view of the sensors each face a shelf 110 along the length 119 of which the apparatus 103 is traveling. As noted earlier, the apparatus 103 is configured to track a pose of the apparatus 103 (e.g. a location and orientation of the center of the chassis 201) in the frame of reference 102, permitting data captured by the apparatus 103 to be registered to the frame of reference 102 for subsequent processing.

Figure 3:
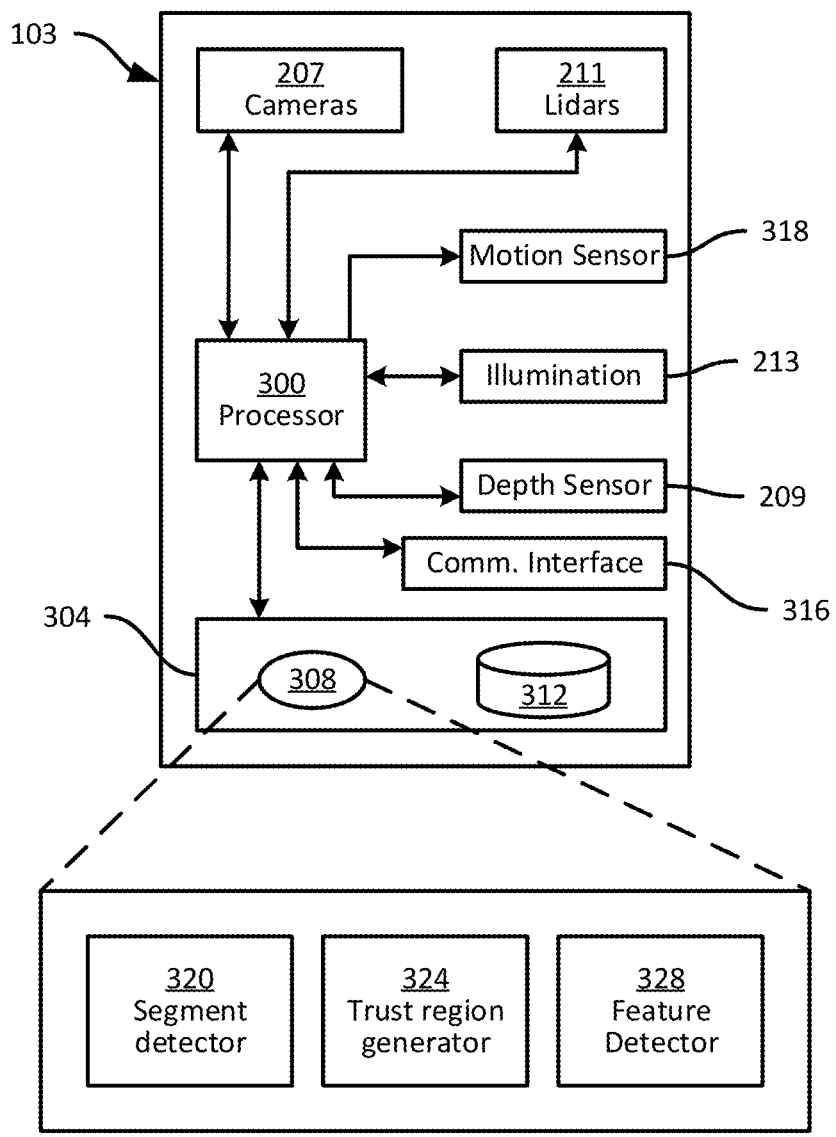
FIG. 3 is a block diagram of certain internal components of the mobile automation apparatus in the system of FIG. 1.

Referring to FIG. 3, certain components of the mobile automation apparatus 103 are shown, in addition to the cameras 207, depth sensor 209, lidars 211, and illumination assemblies 213 mentioned above. The apparatus 103 includes a special-purpose controller, such as a processor 300, interconnected with a non-transitory computer readable storage medium, such as a memory 304. The memory 304 includes a suitable combination of volatile memory (e.g. Random Access Memory or RAM) and non-volatile memory (e.g. read only memory or ROM, Electrically Erasable Programmable Read Only Memory or EEPROM, flash memory). The processor 300 and the memory 304 each comprise one or more integrated circuits. The memory 304 stores computer readable instructions for execution by the processor 300. In particular, the memory 304 stores a control application 308 which, when executed by the processor 300, configures the processor 300 to perform various functions related to detecting an end of an aisle through which the apparatus 103 is navigating.

The processor 300, when so configured by the execution of the application 308, may also be referred to as a controller 300. Those skilled in the art will appreciate that the functionality implemented by the processor 300 via the execution of the application 308 may also be implemented by one or more specially designed hardware and firmware components, such as FPGAs, ASICs and the like in other embodiments.

The memory 304 may also store a repository 312 containing, for example, a map of the environment in which the apparatus 103 operates, for use during the execution of the application 308 (i.e. during the detection of the end of the aisle). The apparatus 103 also includes a communications interface 316 enabling the apparatus 103 to communicate with the server 101 (e.g. via the link 105 or via the dock 106 and the link 107), for example to receive instructions to navigate to specified locations and initiate data capture operations. The application 308 can include a segment detector 320 configured to detect shelf edge segments, a trust region generator 324 to generate dynamic trust regions and determine whether the shelf edge segments are acceptable, and a feature detector 328 configured to detect end-of-aisle features, such as a vertical segment of a shelf module.

In addition to the sensors mentioned earlier, the apparatus 103 includes a motion sensor 318, such as one or more wheel odometers coupled to the locomotive assembly 203. The motion sensor 318 can also include, in addition to or instead of the above-mentioned wheel odometer(s), an inertial measurement unit (IMU) configured to measure acceleration along a plurality of axes.

Figure 4:
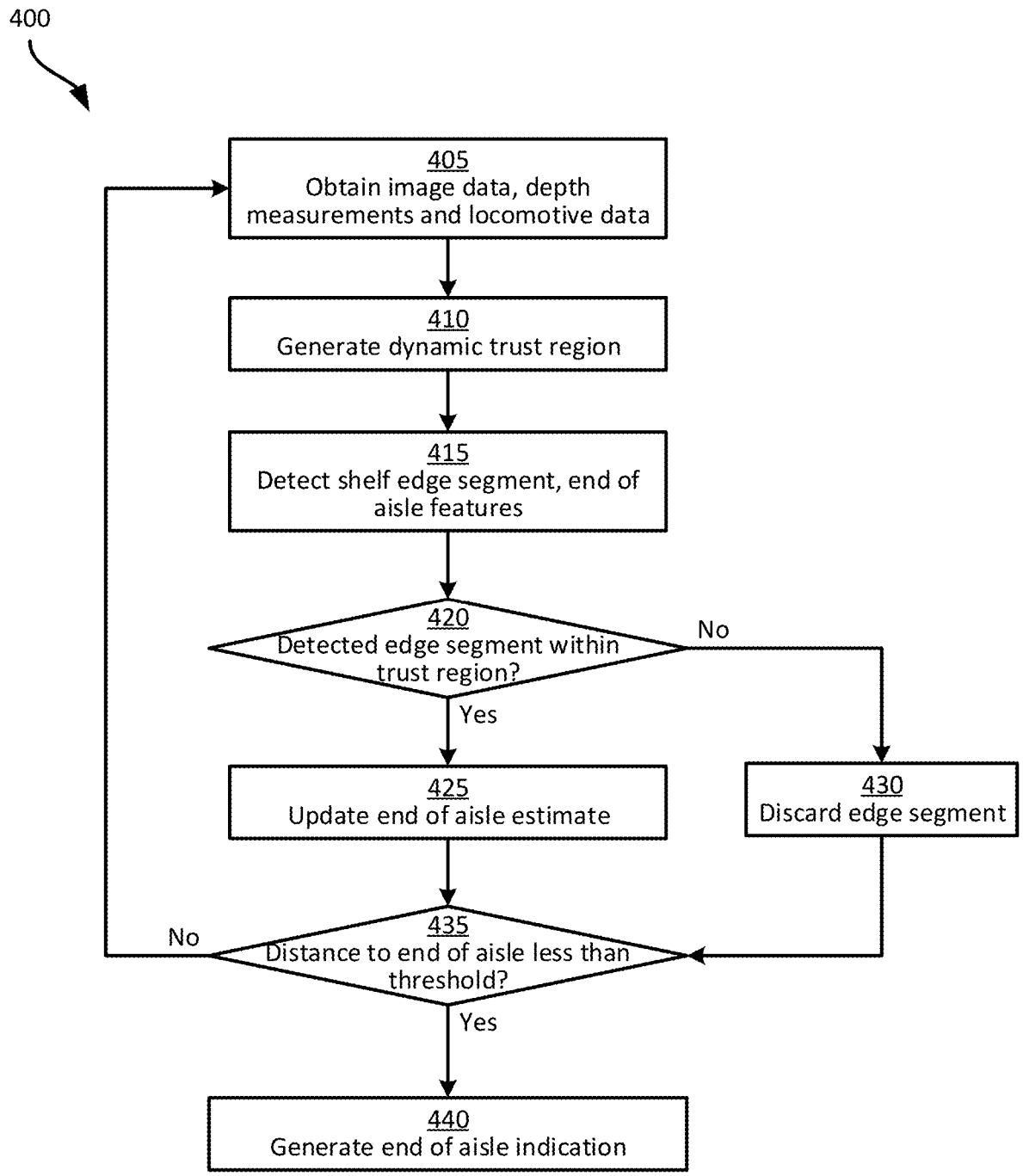
FIG. 4 is a flowchart of a method of detecting the end of an aisle in the system of FIG. 1.

The actions performed by the apparatus 103, and specifically by the processor 300 as configured via execution of the application 308, to detect ends of aisle will now be discussed in greater detail with reference to FIG. 4. FIG. 4 illustrates a method 400 of detecting an end of an aisle of shelf modules through which the apparatus 103 is navigating. The method 400 will be described in conjunction with its performance in the system 100, and in particular by the apparatus 103, with reference to the components illustrated in FIGS. 2 and 3. As will be apparent in the discussion below, in other examples, some or all of the processing performed by the server 101 may be performed by the apparatus 103, and some or all of the processing performed by the apparatus 103 may be performed by the server 101.

At block 405, the processor 300 is configured to obtain image data and depth measurements captured, respectively, by an image sensor and a depth sensor and corresponding to an area containing a portion of the aisle. In particular, the area may contain shelf modules and support surfaces on the shelf modules. The image data and depth measurements obtained at block 405 are, for example, captured by the apparatus 103 and stored in the repository 132. The processor 300 is therefore configured, in the above example, to obtain the image data and the depth measurements by retrieving the image data and the depth measurements from the repository 132.

In some examples, the processor 300 can also be configured to perform one or more filtering operations on the depth measurements. For example, depth measurements greater than a predefined threshold may be discarded from the data captured at block 405. Such measurements may be indicative of surfaces beyond the shelf backs 116 (e.g. a ceiling, or a wall behind a shelf back 116). The predefined threshold may be selected, for example, as the sum of the known depth of a shelf 110 and the known width of an aisle.

The processor 300 is further configured, at block 405, to obtain locomotive data related to the movement and position of the apparatus 103. The locomotive data can include a velocity of the apparatus 103 and a pose of the apparatus 103. In particular, the pose can include a distance and a yaw of the apparatus 103 relative to an estimated shelf edge. Additionally, the pose can include a confidence level indicating a level of confidence (e.g. expressed as a fraction, percentage, or the like) in the accuracy of the distance and yaw values provided.

At block 410, the processor 300, and in particular trust region generator 324 generates a dynamic trust region based on the locomotive data obtained at block 405. Generally, the dynamic trust region is a three-dimensional space for assessing the usability of shelf edge segments in detecting the estimated end of the aisle, as will be described in greater detail below. The dynamic trust region may have a base represented by a two-dimensional shape, and a predetermined height (e.g. extending from the floor of the aisle to a top of the shelf module). Thus the processor 300 may control the shape and size of the dynamic trust region based on the locomotive data obtained at block 405 to accept data points which are expected to be more accurate.

Figure 5A:
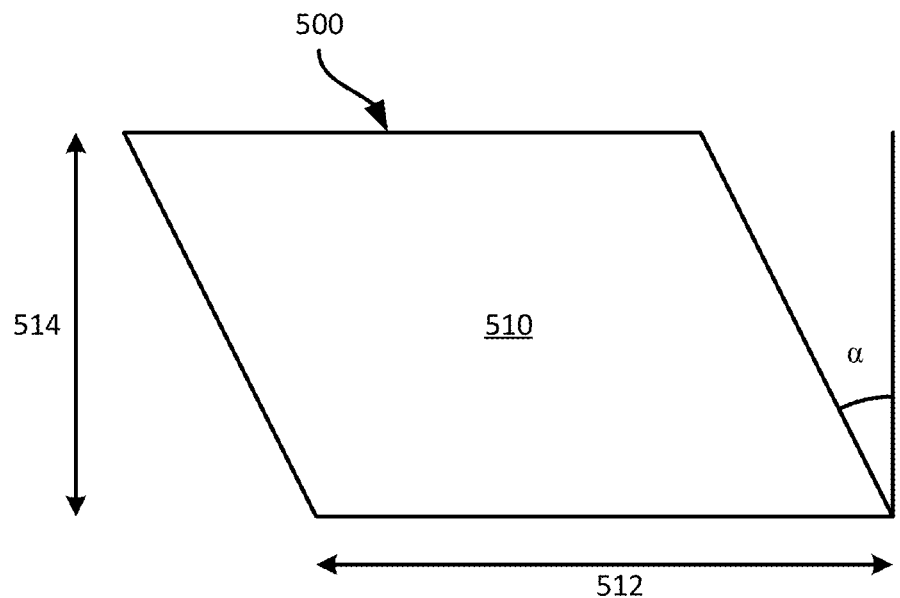
FIG. 5A is a diagram of a dynamic trust region generated during the performance of the method of FIG. 4.

For example, referring to FIG. 5A, a schematic top view of a dynamic trust region 500 is depicted. In the present example, the dynamic trust region 500 is a right rhombic prism defined by a base 510 and a predetermined height (e.g. extending from the floor of the aisle to a top of the shelf module). The base 510 is a parallelogram defined by width 512 extending parallel to the length of the aisle, an altitude 514 extending perpendicular to the length of the aisle (i.e. parallel to the shelf depth), and an angle α ranging between 0° and 90°. The shape of the base 510 of the dynamic trust region 500 is determined based on the locomotive data obtained at block 405.

In particular, the width 512 of the base 510 may vary based on the current velocity of the apparatus 103 and the current pose of the apparatus 103. For example, when the apparatus 103 is travelling at a high velocity, the data collected is expected to be of poorer quality relative to the data collected when travelling at a low velocity. Thus, as the velocity of the apparatus 103 increases, the width 512 decreases, thereby reducing the area of the base 510. That is, the dynamic trust region 500 is increased in an inverse correlation with the velocity of the apparatus 103. Similarly, when the locomotive data of the apparatus 103 includes a pose having a low confidence level (i.e. higher uncertainty), the data collected is expected to be of poorer quality relative to the data collected with a pose with a high confidence level. Thus, as the confidence level decreases, the width 512 also decreases. That is, the dynamic trust region 500 is increased in a direct correlation with the confidence level of the pose of the apparatus. More generally, when the locomotive data is indicative of high quality data, the dynamic trust region 500 increases in size, and allows more data points to be accepted. In contrast, when the locomotive data is indicative of low quality data, the dynamic trust region 500 decreases in size.

In the present example, the altitude 514 of the base 510 is defined based on a predefined relationship with the width (i.e. ⅓ of the width 512). In other examples, the altitude 514 may also vary based on the locomotive parameters of the apparatus 103 or may be fixed.

The angle α of the base 510 may vary based on the current yaw of the apparatus 103 relative to the estimated shelf edge. For example, when the yaw is low relative to the estimated shelf edge (i.e. the apparatus 103 is travelling substantially parallel to the estimated shelf edge), the processor 300 may expect that the detected shelf edge segments are more likely to represent shelf edges than when the yaw is high. In particular, when the yaw is high, the apparatus 103 is more likely to detect segments representing, for example, edges of products on the shelves, in addition to the shelf edge segments. Thus, when yaw is high, the angle α may be increased, thereby skewing the base 510 to accept data points further along the length of the aisle, where detected edge segments are more likely to be shelf edge segments.

The processor 300 is further configured, at block 410, to determine a placement of the dynamic trust region. Specifically, the processor 300 obtains an accumulated segment representing the current shelf edge estimate, as determined based on previously detected and accepted shelf edge estimates. The processor 300 then situates the dynamic trust region relative to the accumulated segment.

Figure 5B:
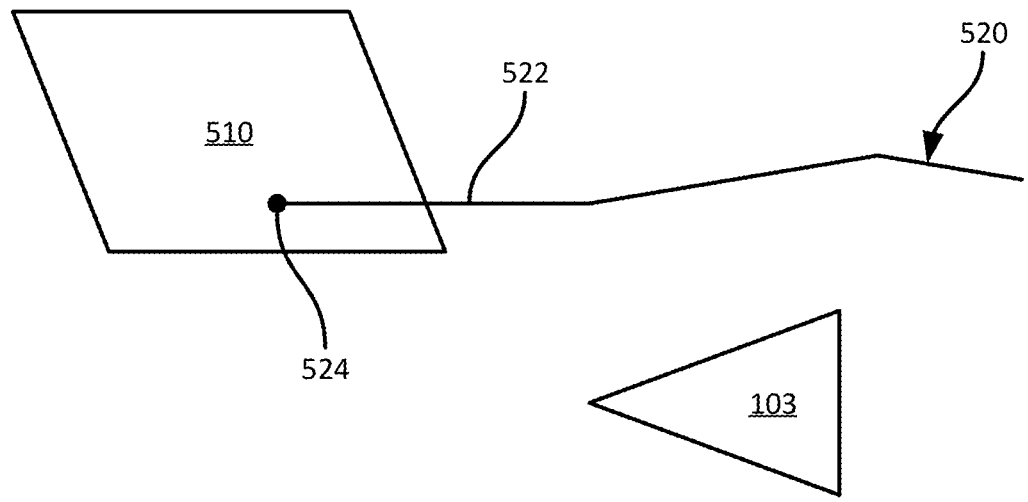
FIG. 5B is a diagram of the positioning of the dynamic trust region during the performance of the method of FIG. 4.

For example, referring to FIG. 5B, a top view of the apparatus 103, an accumulated segment 520, and the dynamic trust region 500 is depicted. In particular, the accumulated segment 520 includes an end segment 522 and an endpoint 524. In the present example, the dynamic trust region 500, and in particular, the base 510, is located substantially parallel to the end segment 522, and a predefined distance (e.g. 5 cm) from the end segment 522, such that the end segment 522 falls within the base 510. Further, the dynamic trust region 500 is located such that the endpoint 524 is at about a midpoint of the width 512 of the base 510. In other examples, the dynamic trust region 500 may be located based on other constraints or criteria (e.g. based on a different predefined distances or ratios, or relative to the apparatus 103, or the like).

Returning to FIG. 4, at block 415, the processor 300, and in particular the segment detector 320 is configured to detect a shelf edge segment based on the image data and the plurality of depth measurements obtained at block 405. Specifically, the processor 300 identifies a shelf edge segment representing at least a portion of an edge 118 of a support surface 117 of a shelf module 110 in the aisle.

In an embodiment, the processor 300 may detect the shelf edge segment based on detecting Hough lines and segmenting the depth measurements using the Hough lines as seeds. Specifically, the processor 300 first detects preliminary edges, for example using Canny edge detection, on the image data. In some examples, the processor 300 may first apply preprocessing operations, such as applying a greyscale and blurring the image to obtain only strong edges. The processor 300 is then configured to detect Hough lines based on the preliminary edges and filter out the Hough lines within a threshold angle of vertical (i.e. filter out Hough lines which are unlikely to represent shelf edges). The processor 300 overlays the Hough lines with the depth measurements (e.g. using a predefined correspondence between the image sensor and the depth sensor) and uses the corresponding depth measurements as seeds for segmenting the depth measurements into different object classes, where each object class represents distinct objects in the aisle (e.g. different shelf edges, products, or the like). The processor 300 selects the largest class satisfying predefined constraints (e.g. expected minimum point density, size, and shape) representing a shelf edge. The processor 300 then applies a line-fitting model to the class of depth measurements. The resulting line segment fitted to the class defines the detected shelf edge segment.

In other embodiments, other methods of detecting shelf edge segments are contemplated.

Figure 6:
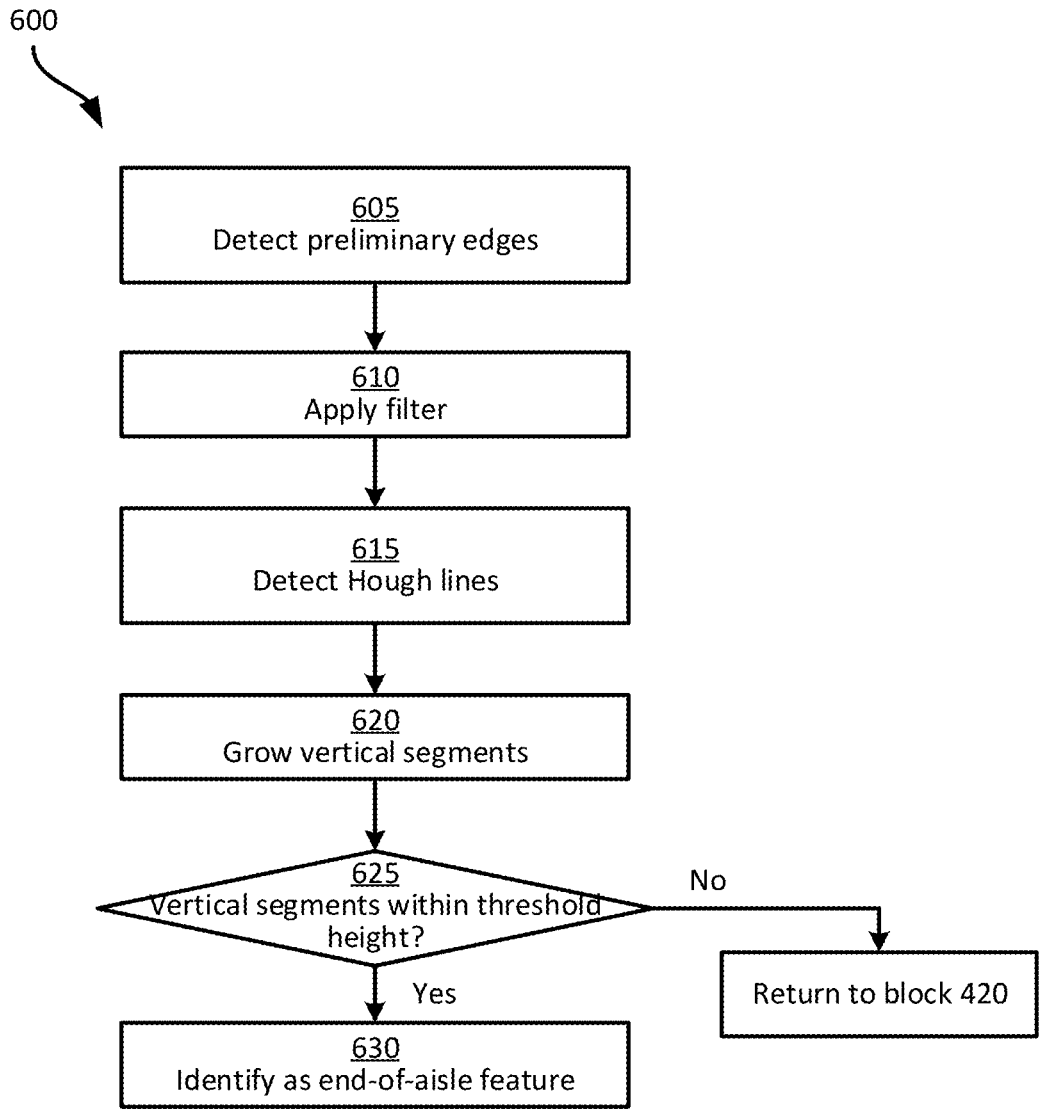
FIG. 6 is a flowchart of a method of detecting end-of-aisle features.

In some embodiments, the processor 300 may further be configured, at block 415, to detect additional aisle features defining the end of the aisle. In particular, the feature detector 328 may use the image data and the depth measurements to detect a vertical edge representing a vertical edge of a shelf module 110, which thus defines the end of the aisle. FIG. 6 depicts a method 600 of detecting an end-of-aisle feature.

At block 605, the processor 300 is configured to detect preliminary edges, for example using Canny edge detection, in the image data. In some examples, the processor 300 may first apply preprocessing operations, such as applying a greyscale and blurring the image data to obtain strong edges.

At block 610, the processor 300 is configured to apply a filter, such as a convolutional filter or a dilation filter, to the preliminary edges to increase the thickness of the preliminary edges.

At block 615, the processor 300 is configured to detect Hough lines based on the preliminary edges and select Hough lines representative of the end-of-aisle features. For example, the processor 300 may select Hough lines within a threshold angle of vertical for further processing and discard other Hough lines (e.g. Hough lines representing shelf edges).

At block 620, the processor 300 is configured to grow vertical segments based on the Hough lines and the filtered image data (i.e. the filtered preliminary edges). Specifically, the processor 300 overlays the Hough lines with the filtered image data and uses the corresponding pixels as seeds. The processor 300 then grows the segments vertically by determining if the upwards and/or downwards pixels are also edge pixels in the filtered image data. In particular, using the filtered image data increases the likelihood that edge pixels will have upwards and downwards neighbors that are edge pixels, allowing shorter vertical segments (e.g. representing objects further away) to be connected.

At block 625, the processor 300 determines whether any of the vertical segments are within a predefined threshold height. Specifically, the processor 300 overlays the vertical segments obtained at block 620 with the depth measurements and uses the depth measurements to determine the relative height of the vertical segments.

When one of the vertical segments is within a threshold height (e.g. approximately a known height of the shelf modules 110), the processor 300 proceeds to block 630 to identify the vertical segment as the end-of-aisle feature.

When none of the vertical segments is within the threshold height, the processor 300 ends the method 600 and returns to block 420

At block 420, the processor 300, and in particular trust region generator 324 determines whether the shelf edge segment detected at block 415 is within the dynamic trust region generated at block 410. In particular, the processor 300 determines whether the shelf edge segment is located at least partially in the dynamic trust region, based on the depth measurements. For example, shelf edge segments which have one endpoint within the dynamic trust region, or which cut through the dynamic trust region may be accepted at block 420. In some embodiments, at least a threshold proportion (e.g. above 50%) of the detected shelf edge segment must be contained in the dynamic trust region to be accepted at block 420.

If the determination at block 420 is affirmative, the method 400 proceeds to block 425. At block 425, the processor 300 is configured to update an estimated end of the aisle based on the detected edge segment. Specifically, the processor 300 adds the shelf edge segment detected at block 415 to the accumulated segment. For example, the processor 300 may be configured to extend the accumulated segment to the current shelf edge segment, for example, by connecting nearest endpoints of the accumulated segment and the current shelf edge segment. In other examples, the processor 300 may be configured to employ one or more line-fitting models based on the current shelf edge segment and at least a portion of the accumulated segment to extend the accumulated segment. The processor 300 may then estimate the endpoint of extended accumulated segment as the estimated end of the aisle.

Figure 7A:
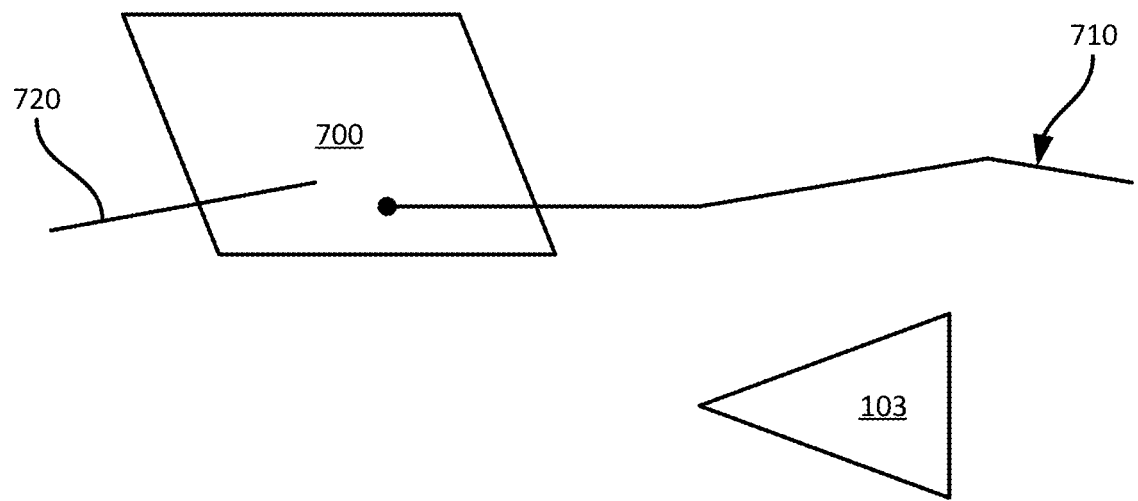
FIG. 7A is a diagram of a detected shelf edge segment and a dynamic trust region generated during the performance of the method of FIG. 4.
Figure 7B:
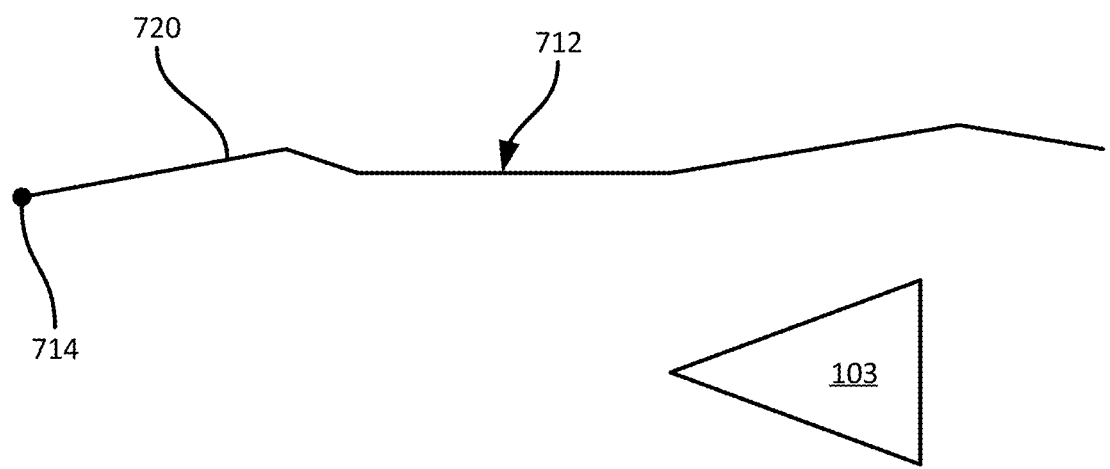
FIG. 7B is a diagram of an extended accumulated segment generated during the performance of the method of FIG. 4.

For example, referring to FIGS. 7A and 7B, a top view of the apparatus 103, a dynamic trust region 700, an accumulated segment 710, and a newly detected shelf edge segment 720 is depicted. As the shelf edge segment 720 is contained partially within the dynamic trust region 700, the shelf edge segment 720 is accepted at block 420. At block 425, the processor 300 extends the accumulated segment 710 to include the shelf edge segment 720, defining an extended accumulated segment 712. The extended accumulated segment 712 includes an endpoint 714. The endpoint 714 is thus determined to be the estimated end of the aisle.

Returning again to FIG. 4, if the determination at block 420 is negative, the method 400 proceeds to block 430. At block 430, the processor 300 discards the shelf edge segment and keeps the existing accumulated segment and its estimated end of the aisle (i.e. its current endpoint) and proceeds to block 435.

At block 435, the processor 300 determines whether the current distance to the estimated end of the aisle is less than a threshold distance (e.g. about 30 cm). Specifically, the processor 300 projects the pose of the apparatus 103 onto the accumulated segment and determines the current distance from the projected pose to the endpoint defining the estimated end of the aisle. If the current distance is not less than the threshold distance, the method 400 returns to block 405 to continue iteratively extending the accumulated segment representing the aisle edge until the accumulated segment cannot be extended further and the estimated end of the aisle is reached.

In some embodiments, the processor 300 may check the current distance to the estimated end of the aisle based on the end-of-aisle feature. Thus, for example, the processor 300 may identify a positive result if the current distance to the end of the aisle, as estimated by either the accumulated segment or the end-of-aisle feature, is less than a threshold distance.

At block 440, the processor 300 generates an indication that the apparatus 103 is within the threshold distance from the end of the aisle. The indication may be propagated to other components of the apparatus 103, such as a navigational controller, to initiate end-of-aisle operations, such as stopping, turning around, turning off lights, sensors, and the like. In particular, the processor 300 may generate different indications based on the apparatus 103 being within the threshold distance of the end-of-aisle feature, the estimated end of aisle based on the accumulated segment, or both.

The method 400 allows the end of the aisle to be estimated based on the estimated shelf edge, thus mitigating risks of false positive and false negative end of aisle identifications as compared to point cloud density methods. In particular, the effect of sparsely populated shelves having low density (false positives) and clutter beyond the end of an aisle having higher density (false negatives) is reduced.

In the foregoing specification, specific embodiments have been described.

However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of detecting an end of an aisle of shelf modules in an imaging controller of a mobile automation apparatus, the method comprising:
   obtaining image data captured by an image sensor and a plurality of depth measurements captured by a depth sensor, the image data and the depth measurements corresponding to an area containing a portion of the aisle of shelf modules;
   obtaining locomotive data of the apparatus;
   generating a dynamic trust region based on the locomotive data;
   detecting an edge segment based on the image data and the plurality of depth measurements, the edge segment representing an edge of a support surface; and
   when the edge segment is located at least partially in the dynamic trust region, updating an estimated end of the aisle based on the detected edge segment.

2. The method of claim 1, wherein updating the estimated end of the aisle comprises:
   obtaining an accumulated segment representing an edge of the aisle;
   extending the accumulated segment to include the detected edge segment; and
   identifying an endpoint of the extended accumulated segment as the estimated end of the aisle.

3. The method of claim 1, wherein the locomotive data comprises one or more of: a velocity of the apparatus, a confidence level of a pose of the apparatus, and a yaw of the apparatus relative to an edge of the aisle.

4. The method of claim 3, wherein generating the dynamic trust region comprises:
   increasing a first dimension of the dynamic trust region in an inverse correlation to the velocity of the apparatus; and
   increasing the first dimension of the dynamic trust region in a direct correlation to the confidence level of the pose of the apparatus.

5. The method of claim 4, wherein the dynamic trust region is a right rhombic prism, and wherein the first dimension is a width of the right rhombic prism.

6. The method of claim 1, wherein generating the dynamic trust region comprises:
   obtaining an accumulated segment representing an edge of the aisle; and
   locating the dynamic trust region at an endpoint of the accumulated segment.

7. The method of claim 1, further comprising detecting an end-of-aisle feature to generate a second estimated end of the aisle.

8. The method of claim 7, wherein detecting the end-of-aisle feature comprises:
   detecting preliminary edges in the image data;
   applying a filter to the preliminary edges to increase a thickness of the preliminary edges;
   detecting Hough lines based on the preliminary edges;
   growing vertical segments based on the filtered preliminary edges, using the Hough lines as seeds;
   determining when one of the vertical segments is within a predefined threshold height; and
   when the determination is positive, identifying the vertical segment as the end-of-aisle feature.

9. The method of claim 1, further comprising:
   determining a distance of the apparatus to the estimated end of the aisle; and
   when the distance is less than a threshold distance, generating an indication that the apparatus is approaching the end of the aisle.

10. A mobile automation apparatus comprising:
    a locomotive assembly;
    an image sensor and a depth sensor; and
    an imaging controller configured to:
       obtain image data captured by an image sensor and a plurality of depth measurements captured by a depth sensor, the image data and the depth measurements corresponding to an area containing a portion of an aisle of shelf modules;
       obtain locomotive data of the apparatus;
       generate a dynamic trust region based on the locomotive data;
       detect an edge segment based on the image data and the plurality of depth measurements, the edge segment representing an edge of a support surface; and when the edge segment is located at least partially in the dynamic trust region, update an estimated end of the aisle based on the detected edge segment.

11. The mobile automation apparatus of claim 10, wherein the imaging controller is configured to update the estimated end of the aisle by:
obtaining an accumulated segment representing an edge of the aisle;
extending the accumulated segment to include the detected edge segment; and
identifying an endpoint of the extended accumulated segment as the estimated end of the aisle.

12. The mobile automation apparatus of claim 10, wherein the locomotive data comprises one or more of: a velocity of the apparatus, a confidence level of a pose of the apparatus, and a yaw of the apparatus relative to an edge of the aisle.

13. The mobile automation apparatus of claim 12, wherein the imaging controller is configured to generate the dynamic trust region by:
increasing a first dimension of the dynamic trust region in an inverse correlation to the velocity of the apparatus; and
increasing the first dimension of the dynamic trust region in a direct correlation to the confidence level of the pose of the apparatus.

14. The mobile automation apparatus of claim 13, wherein the dynamic trust region is a right rhombic prism, and wherein the first dimension is a width of the right rhombic prism.

15. The mobile automation apparatus of claim 10, wherein the imaging controller is configured to generate the dynamic trust region by:
obtaining an accumulated segment representing an edge of the aisle; and
locating the dynamic trust region at an endpoint of the accumulated segment.

16. The mobile automation apparatus of claim 10, wherein the imaging controller is further configured to detect an end-of-aisle feature to generate a second estimated end of the aisle.

17. The mobile automation apparatus of claim 16, wherein the imaging controller is configured to detect the end-of-aisle feature by:
detecting preliminary edges in the image data;
applying a filter to the preliminary edges to increase a thickness of the preliminary edges;
detecting Hough lines based on the preliminary edges;
growing vertical segments based on the filtered preliminary edges, using the Hough lines as seeds;
determining when one of the vertical segments is within a predefined threshold height; and
when the determination is positive, identifying the vertical segment as the end-of-aisle feature.

18. The mobile automation apparatus of claim 10, wherein the imaging controller is further configured to:
determining a distance of the apparatus to the estimated end of the aisle; and
when the distance is less than a threshold distance, generating an indication that the apparatus is approaching the end of the aisle.

* * * * *